United States Patent
Harrison et al.

(10) Patent No.: US 7,917,754 B1
(45) Date of Patent: Mar. 29, 2011

(54) METHOD AND APPARATUS FOR LINKING BUSINESSES TO POTENTIAL CUSTOMERS THROUGH A TRUSTED SOURCE NETWORK

(75) Inventors: Kyle G. Harrison, San Francisco, CA (US); Gerard James Sulentic, San Francisco, CA (US); Kevin M. Reeth, II, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1130 days.

(21) Appl. No.: 11/556,371

(22) Filed: Nov. 3, 2006

(51) Int. Cl.
*H04L 9/32* (2006.01)

(52) U.S. Cl. .............. 713/168; 705/1; 705/26; 705/27; 705/78; 705/64

(58) Field of Classification Search .............. 713/168; 707/102; 705/1, 26–27, 78, 64
See application file for complete search history.

(56) References Cited

U.S. PATENT DOCUMENTS

| | | | | |
|---|---|---|---|---|
| 6,029,141 A | * | 2/2000 | Bezos et al. | 705/27 |
| 6,064,980 A | * | 5/2000 | Jacobi et al. | 705/26 |
| 6,957,199 B1 | * | 10/2005 | Fisher | 705/78 |

* cited by examiner

*Primary Examiner* — Thanhnga B Truong
*Assistant Examiner* — Angela Holmes
(74) *Attorney, Agent, or Firm* — Gunnison, McKay & Hodgson, L.L.P.; Philip McKay

(57) ABSTRACT

In accordance with one embodiment, a method and apparatus for linking businesses to customers through a trusted source network includes creating and providing an authenticated rating and review/referral database. The authenticated rating and review/referral database is then used as a central hub to distribute authenticated ratings and reviews to various interested parties in one or more trusted source networks and/or through one or more portals linked to existing trusted source networks.

26 Claims, 12 Drawing Sheets

FIG. 5

METHOD AND APPARATUS FOR LINKING BUSINESSES TO POTENTIAL CUSTOMERS THROUGH A TRUSTED SOURCE NETWORK

BACKGROUND

Traditionally, one of the primary methods for a business, and in particular a small business, to obtain new customers was through "word of mouth" recommendations and/or referrals. Traditionally, the more trusted the source of a word-of-mouth recommendation, such as from a personal friend, the more likely the recommendation was to be taken and/or acted upon. Two primary forms of word-of-mouth recommendations exist; one being recommendations from a trusted contact or group of contacts, such as friends and acquaintances; the other being referrals from one business to another business where the referring business is a trusted contact and/or has an existing relationship with the potential customer.

While word of mouth recommendations are still, by far, the most trusted form of recommendation, word-of-mouth recommendation networks are typically extremely slow, very inefficient, and can be very volatile and unreliable. Consequently, in the $21^{st}$ century, a small business, and particularly a small business just starting up, may not have the time and/or economic resources to wait for a significant word-of-mouth network to develop. In addition, as people's lives have become busier and more complicated, the types of personal relationships required to effectively create a word-of-mouth network have given way to a more virtually world, typically connected through the Internet, and much faster paced lives.

As a result, both trusted contact and business-to-business referrals have recently been supplemented with networked communities, typically connected via a network, such as the Internet or other private or public mechanism. Networked communities typically include persons who share common interests, residential districts, political beliefs, religious beliefs, or any other social, political, and or personal attributes that bring these people together in the networked communities, often trough a community website, to share ideas and resources. While, networked communities have many attributes that would make them ideal for replacing the word-of-mouth recommendation networks, networked communities are typically not formed around the concept of making merchant recommendations and therefore typically lack any sophisticated or efficient mechanism for soliciting reviews and recommendations, authenticating the source of reviews and/or recommendations, and/or distributing the reviews and/or recommendations. Consequently, while effective in many areas, networked communities have typically failed to provide an effective business recommendation service to replace word of mouth networks.

In addition, another recent source of business and/or merchant recommendations are the now commonly known and used ratings and review systems, including community-based ratings and review systems. Currently, there exist several types and/or models of rating and review systems. Typically, a rating and review system provides a review forum and rating and recommendation service for various businesses and/or products. Current rating and review systems typically provide listings of businesses, often based on a selected community, topic, organization, and/or membership service, and various products, as well as a user review and/or feedback forum and/or user rating system for the businesses and/or products listed.

Some currently available ratings and review systems are specifically designed to provide a potential customer with information about potential businesses and/or merchants and/or products. However, using currently available ratings and review systems a given review or rating is typically never authenticated. Therefore, current rating and review systems are highly susceptible to submission of baseless and/or false reviews and/or other malicious manipulation by third parties, dishonest reviewers, competitors of the business and/or product being reviewed. As a result, a potential customer can never be sure of the source of the review, the motivations of the reviewer, or even if the reviewer has similar concerns and needs as the potential customer/user. Consequently, while a valuable tool, current rating and review systems lack a sense of community and the all important credibility/trust factor that makes word-of-mouth recommendation networks so appealing.

As noted above, word-of-mouth recommendation networks have significant flaws and are in many ways a throwback to a more personal, neighborhood-based, time that has, in many respects, and for better or for worse, yielded to an Internet connected and faster-paced lifestyle. However, the fast pace of modern purchasing transactions has, in many respects, only increased the desire in many potential customers to connect with a trusted, or at least authenticated, contact to provide recommendations for businesses and/or merchants and/or products. This is particularly true in the general service industries and personal service industries that have come to dominate the Western world's economies.

SUMMARY

In accordance with one embodiment, a method and apparatus for linking businesses to customers through a trusted source network includes creating an authenticated rating and review/referral database. In one embodiment, the authenticated rating and review/referral database is then used as a hub to distribute authenticated ratings and reviews to various interested parties in one or more trusted source networks and/or through one or more portals linked to existing trusted source networks.

In one embodiment, ratings and reviews are collected through known sources, such as known e-mails and/or known websites, so that the source of a given rating and review can be easily authenticated. Consequently, in accordance with one embodiment, the source and/or reviewer of the ratings and reviews residing in the authenticated rating and review/referral database is known.

In one embodiment, the authenticated rating and review/referral database is then linked to one or more websites, such as related industry-wide websites and/or local/neighborhood business listings and the authenticated ratings and reviews are provided to, and/or can be accessed through, the one or more websites directly.

In one embodiment the authenticated rating and review/referral database is linked to a networked community such that the authenticated ratings and reviews are provided to the networked community members through the networked community network and/or website. In one embodiment, the authenticated ratings and reviews are screened and only ratings and reviews submitted from members of the networked community, either through the networked community website, or through third-party sources, are provided to other members of the networked community.

In one embodiment, business-to-business referrals are made through businesses and/or business websites into the authenticated rating and review/referral database. In one embodiment, the authenticated rating and review/referral database is then used to create a business-to-business referral network based on the authenticated referrals submitted by the specific businesses. In other embodiments, an existing business-to-business referral network is linked to the authenticated rating and review/referral database and the members of the business-to-business referral network are provided access to the authenticated ratings and reviews in the authenticated rating and review/referral database.

In one embodiment, two or more of the trusted source networks discussed above are connected through the centralized authenticated rating and review/database to create a multi-component trusted source network based on the authenticated ratings and reviews and/or referrals provided through the authenticated rating and review/referral database. In one embodiment, all of the networks discussed above are connected into a single multi-component trusted source network.

Using the method and apparatus for linking businesses to customers through a trusted source network disclosed herein, a business is provided with the immediate benefit of being able to easily start collecting authenticated reviews and feedback from their customers and these authenticated ratings and reviews are easily distributed to one or more other websites since, in one embodiment, the only source of the ratings and reviews is the central authenticated rating and review/referral database. Consequently, businesses are not only provided with an opportunity to increase their exposure to potential clients, but they also can collect ratings from a wider audience. In addition, at a minimum, a potential customer/user is provided with authenticated ratings and reviews from authenticated sources so that, at a minimum, the potential customer is at least assured that a given rating or review is bona fide review received through a bona fide source.

In addition, in embodiments where the authenticated rating and review/referral database is linked to one or more networked communities, the potential customers/members of the networked community are, in one embodiment, provided with only those ratings and reviews submitted by other members of the networked community and, therefore, the potential customer/member receives a recommendation from, if not a trusted source/contact, at least a source/contact having a similar lifestyle, attributes, values, and/or needs. In addition, in one embodiment, the authenticated rating and review/referral database, and the authenticated ratings and reviews, are accessed directly through the networked community's website so that the potential customer/member feels they are never leaving their trusted community, in essence providing the comfort of an electronic or "virtual" neighborhood.

In addition, in embodiments were the authenticated rating and review/referral database is used to link businesses together for business-to-business referrals, the businesses are exposed to new prospects through the trusted and authenticated ratings and reviews/referrals of the authenticated rating and review/referral database. Consequently, the businesses are strongly motivated to utilize the resultant business-to-business referral network as a means of increasing the range of their own network of contacts and/or customers.

In embodiments where one or more of the various networks and/or elements discussed above are brought together through the authenticated rating and review/referral database, relatively large-scale multi-component trusted source networks are created that have the potential to provide most of the benefits of the old word-of-mouth networks while, at the same time, eliminating the inefficiency and impracticality of the old word-of-mouth networks and, in essence, bringing word-of-mouth network functionality into the 21st century.

In addition, as discussed in more detail below, using the below embodiments, with little or no modification and/or user input, there is considerable flexibility, adaptability, and opportunity for customization to meet the specific needs of various user's under numerous circumstances.

BRIEF DESCRIPTION OF THE DRAWINGS

FIG. 5 shows a representation of a website screen display including a website based rating link in accordance with one embodiment;

Figure 1:
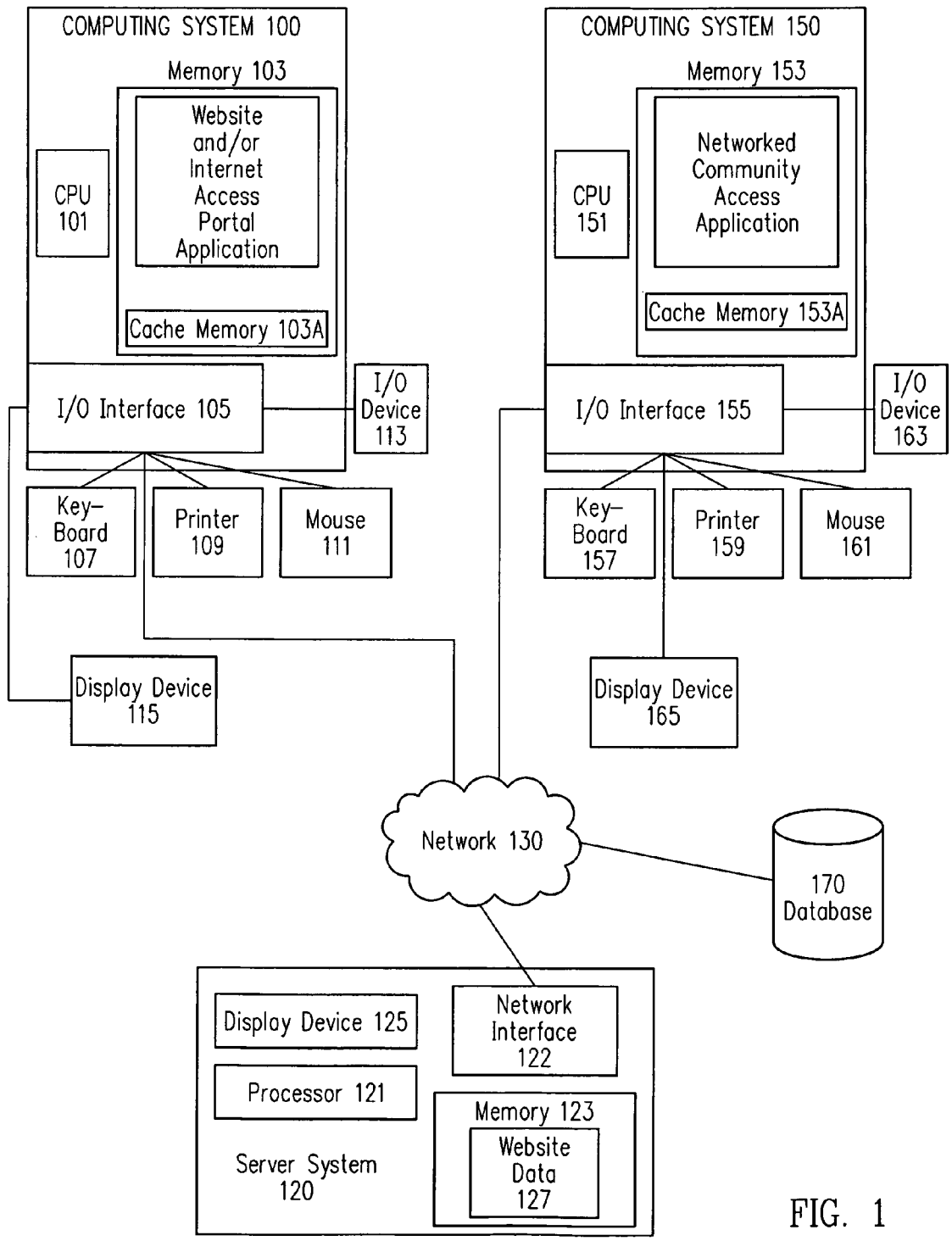
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

In accordance with one embodiment, a method and apparatus for linking businesses to customers through a trusted source network includes creating an authenticated rating and review/referral database. In one embodiment, the authenticated rating and review/referral database is then used as a hub to distribute authenticated ratings and reviews to various interested parties in one or more trusted source networks and/or through one or more portals linked to existing trusted source networks.

In one embodiment, ratings and reviews are collected through known sources, such as known e-mails and/or known websites, so that the source of a given rating and review can be easily authenticated. Consequently, in accordance with one embodiment, the source and/or reviewer of the ratings and reviews residing in the authenticated rating and review/referral database is known.

In one embodiment, the authenticated rating and review/referral database is then linked to one or more websites, such as related industry-wide websites and/or local/neighborhood business listings and the authenticated ratings and reviews are provided to, and/or can be accessed through, the one or more websites directly.

In one embodiment the authenticated rating and review/referral database is linked to a networked community such that the authenticated ratings and reviews are provided to the networked community members through the networked community network and/or website. In one embodiment, the authenticated ratings and reviews are screened and only ratings and reviews submitted from members of the networked community, either through the networked community website, or through third-party sources, are provided to other members of the networked community.

In one embodiment, business-to-business referrals are made through businesses and/or business websites into the authenticated rating and review/referral database. In one embodiment, the authenticated rating and review/referral database is then used to create a business-to-business referral network based on the authenticated referrals submitted by the specific businesses. In other embodiments, an existing business-to-business referral network is linked to the authenticated rating and review/referral database and the members of the business-to-business referral network are provided access to the authenticated ratings and reviews in the authenticated rating and review/referral database.

In one embodiment, two or more of the trusted source networks discussed above are connected through the centralized authenticated rating and review/database to create a multi-component trusted source network based on the authenticated ratings and reviews and/or referrals provided through the authenticated rating and review/referral database. In one embodiment, all of the networks discussed above are connected into a single multi-component trusted source network.

Using the method and apparatus for linking businesses to customers through a trusted source network disclosed herein, a business is provided with the immediate benefit of being able to easily start collecting authenticated reviews and feedback from their customers and these authenticated ratings and reviews are easily distributed to one or more other websites since, in one embodiment, the only source of the ratings and reviews is the central authenticated rating and review/referral database. Consequently, businesses are not only provided with an opportunity to increase their exposure to potential clients, but they also can collect ratings from a wider audience. In addition, at a minimum, a potential customer/user is provided with authenticated ratings and reviews from authenticated sources so that, at a minimum, the potential customer is at least assured that a given rating or review is bona fide review received through a bona fide source.

In addition, in embodiments where the authenticated rating and review/referral database is linked to one or more networked communities, the potential customers/members of the networked community are, in one embodiment, provided with only those ratings and reviews submitted by other members of the networked community and, therefore, the potential customer/member receives a recommendation from, if not a trusted source/contact, at least a source/contact having a similar lifestyle, attributes, values, and/or needs. In addition, in one embodiment, the authenticated rating and review/referral database, and the authenticated ratings and reviews, are accessed directly through the networked community's website so that the potential customer/member feels they are never leaving their trusted community, in essence providing the comfort of an electronic or "virtual" neighborhood.

In addition, in embodiments were the authenticated rating and review/referral database is used to link businesses together for business-to-business referrals, the businesses are exposed to new prospects through the trusted and authenticated ratings and reviews/referrals of the authenticated rating and review/referral database. Consequently, the businesses are strongly motivated to utilize the resultant business-to-business referral network as a means of increasing the range of their own network of contacts and/or customers.

In embodiments where one or more of the various networks and/or elements discussed above are brought together through the authenticated rating and review/referral database, relatively large-scale multi-component trusted source networks are created that have the potential to provide most of the benefits of the old word-of-mouth networks while, at the same time, eliminating the inefficiency and impracticality of the old word-of-mouth networks and, in essence, bringing word-of-mouth network functionality into the 21st century.

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows° Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the website and/or Internet access portal applications described herein make use of input provided to the computer device implementing the process and/or application for linking businesses to customers through a trusted source network, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a process and/or application for linking businesses to customers through a trusted source network, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more website and/or Internet access portal applications 180 stored, in whole, or in part, therein, that are a parent system for, are used by, or include, as discussed below, a process and/or application for linking businesses to customers through a trusted source network, such as processes 200, 700, 900, and 1100, discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, processes 200, 700, 900, and 1100, and a website and/or Internet access portal application 180, can be loaded, in whole, or in part, into computing system 100 via I/O device 113, such as from a CD, DVD or floppy disk containing all, or part, of website and/or Internet access portal application 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more networked community access applications 190 stored, in whole, or in part, therein, that is a parent system for, is used by, or include, as discussed below, a process and/or application for linking businesses to customers through a trusted source network, such as processes 200, 700, 900, and 1100.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, processes 200, 700, 900, and 1100, and a networked community access application 190, can be loaded, in whole, or in part, into computing system 150 via I/O device 163, such as from a CD, DVD or floppy disk containing all, or part, of networked community access application 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. In one embodiment, database 170 is a normalized database as defined below. In one embodiment, database 170 is an authenticated rating and review data base, as discussed in more detail below. As also discussed in more detail below, in one embodiment, a process and/or application for linking businesses to customers through a trusted source network, such as processes 200, 700, 900, and 1100, and/or website and/or Internet access portal application 180 and/or networked community access application 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for linking businesses to customers through a trusted source network, such as processes 200, 700, 900, and 1100, and a website and/or Internet access portal application 180 and/or networked community access application 190 are stored in whole, or in part, in server system 120. In addition, in one embodiment, server system memory 123 includes website data 127 used to generate and display a website, such as a business website, and/or a product manufacturer website and/or a user website and/or a networked community website and/or a business to business referral network website, as discussed in more detail below.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for linking businesses to customers through a trusted source network, such as processes 200, 700, 900, and 1100, and a website and/or Internet access portal application 180 and/or networked community access application 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for linking businesses to customers through a trusted source network, such as process for linking businesses to customers through a trusted source network 200, 700, 900, and 1100 and an application, such as applications 180 and/or 190, are sometimes referred to herein, alternatively, as a process, an application, a module, a program, a component of a software system, a component of a software package, a component of a parent system, or a feature of a parent system, this terminology is illustrative only. In some embodiments, a process and/or application for linking businesses to customers through a trusted source network, such as processes 200, 700, 900, and 1100, and an application, such as applications 180 and/or 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for linking businesses to customers through a trusted source network, such as processes 200, 700, 900, and 1100, and an application, such as applications 180 and/or 190, discussed herein, by processor 101, processor 151, or server system processor 121, results in the operations of an agent computer process (not shown) and/or a rule computer process (not shown).

In one embodiment, a process and/or application for linking businesses to customers through a trusted source network, such as processes 200, 700, 900, and 1100, and an application, such as applications 180 and/or 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removable from the computing system.

For example, all, or part, of a process and/or application for linking businesses to customers through a trusted source network, such as processes 200, 700, 900, and 1100, and an application, such as applications 180 and/or 190, discussed herein, may be stored in a memory that is physically located in a location, such as server system memory 123, or database 170, of FIG. 1, different from a computing system, such as computing systems 100 and/or 150 of FIG. 1, utilizing a process and/or application for linking businesses to customers through a trusted source network, such as processes 200, 700, 900, and 1100, and an application, such as applications 180 and/or 190. In one embodiment, all, or part, of a process and/or application for linking businesses to customers through a trusted source network, such as processes 200, 700, 900, and 1100, and an application, such as applications 180 and/or 190, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process and/or application for linking businesses to customers through a trusted source network, such as processes 200, 700, 900, and 1100, and an application, such as applications 180 and/or 190, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for linking businesses to customers through a trusted source network, such as processes 200, 700, 900, and 1100, and an application, such as applications 180 and/or 190, discussed herein, in accordance with at least one of the embodiments as described herein. Similarly, in another embodiment, a process and/or application for linking businesses to customers through a trusted source network, such as processes 200, 700, 900, and 1100, and an application, such as applications 180 and/or 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In one embodiment, an authenticated rating and review/referral database is provided and ratings and reviews are collected and transferred to the authenticated rating and review/referral database. In on embodiment, the source and/or reviewer of the ratings and reviews residing in the authenticated rating and review/referral database is then authenticated. In one embodiment, the authenticated rating and review/referral database is then linked to one or more websites, such as related industry-wide websites and/or local/neighborhood business listings to create a trusted source network. In one embodiment, the authenticated ratings and reviews are then provided to, and/or can be accessed through, any of the one or more websites directly.

Figure 2:
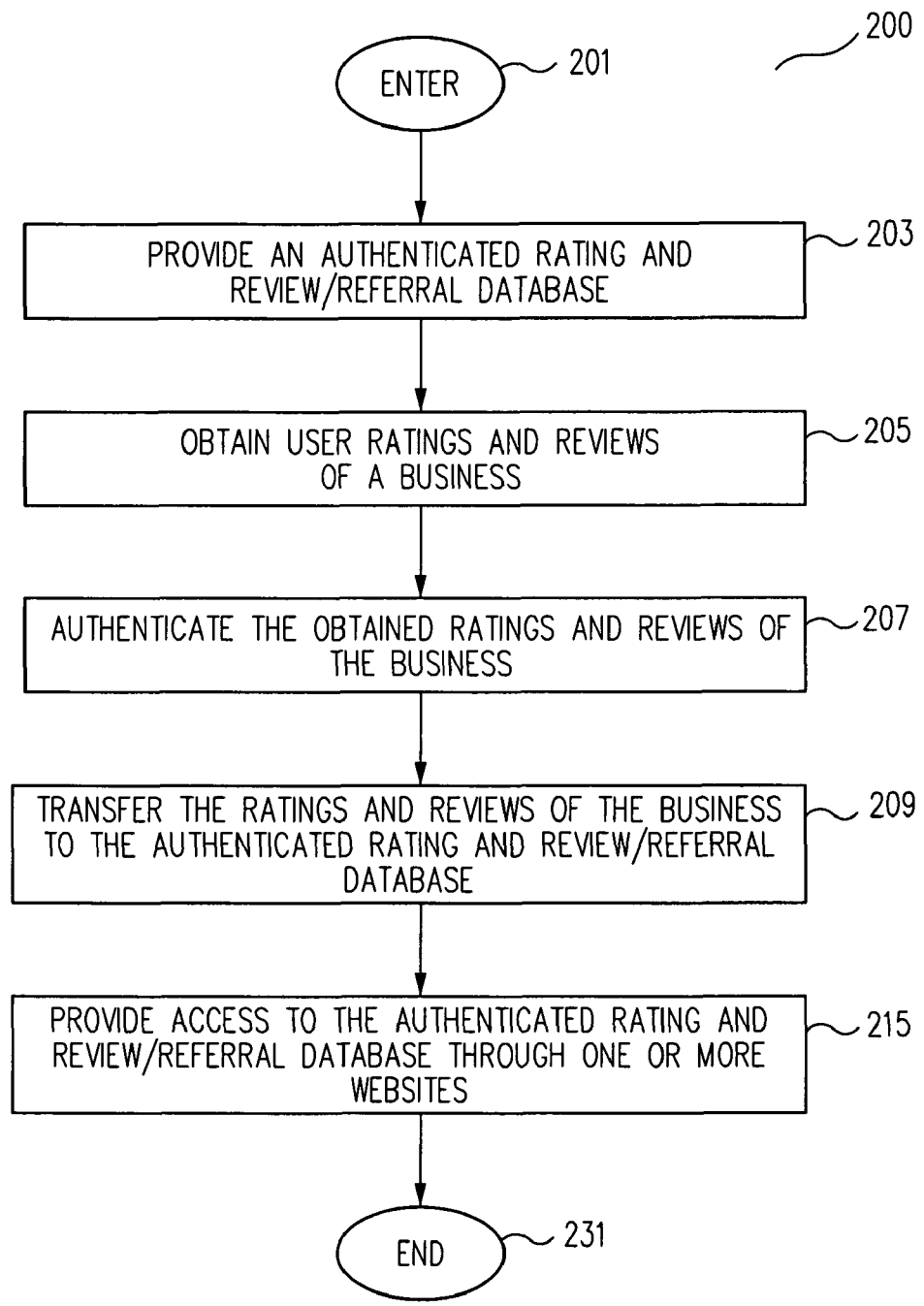
FIG. 2 is a flow chart depicting a process for linking businesses to customers through a trusted source network in accordance with one embodiment.

FIG. 2 is a flow chart depicting a process for linking businesses to customers through a trusted source network 200 in accordance with one embodiment. Process for linking businesses to customers through a trusted source network 200 begins at ENTER OPERATION 201 and process flow proceeds to PROVIDE A AUTHENTICATED RATING AND REVIEW/REFERRAL DATABASE OPERATION 203.

In one embodiment, at PROVIDE A AUTHENTICATED RATING AND REVIEW/REFERRAL DATABASE OPERATION 203 a database, or other electronic data repository, is provided for storing ratings and reviews obtained as discussed in more detail below.

As used herein, the terms "database", or "authenticated rating and review/referral database" are used interchangeably and include, but are not limited to; any server system or computing system, or a designated portion of a server system or computing system, such as computing systems 100, 150 and 120 of FIG. 1; any dedicated storage device; any database such as database 170 of FIG. 1; any mass storage device implemented in software, hardware, or a combination of hardware and software; any web-based function; and/or any collection of one or more of the above that are connected by a network or network system such as, network 130 of FIG. 1 and/or a Local Area Network (LAN), a Wide Area Network (WAN), a public network, such as the Internet, a private network, or other network capable of allowing communication between two or more computing systems and one or more databases, whether available or known at the time of filing or as later developed.

Returning to FIG. 2, in one embodiment, the database provided is a normalized, or standardized, database for easy mapping of fields and transfer of data. As used herein, the term "normalized database" refers to a data base whose logical data model has been restructured to: standardize data formatting; eliminate redundancy, i.e., eliminate storing the same data in more than one table; organize data efficiently and ensure data dependencies make sense, i.e., only storing related data in a table; and reduce the potential for anomalies during data operations to improve data consistency and future enhancements. In contrast, a database that is not normalized is one that has not been broken down logically into smaller, more manageable tables and may include data that is contained in one or more different tables for no apparent reason.

In one embodiment, the database provided is embedded in, or on, a computer program product as defined herein and is then distributed to users.

In one embodiment, once an authenticated rating and review/referral database has been provided at PROVIDE A AUTHENTICATED RATING AND REVIEW/REFERRAL DATABASE OPERATION 203, process flow proceeds to OBTAIN USER RATINGS AND REVIEWS OF A BUSINESS OPERATION 205.

In one embodiment, at OBTAIN USER RATINGS AND REVIEWS OF A BUSINESS OPERATION 205 ratings and/or reviews are obtained. In one embodiment, the rating and reviews are obtained from new and/or authenticated sources, as discussed in more detail below. In other embodiments, the ratings and reviews are obtained from existing ratings and review systems.

As discussed in more detail below, in one embodiment, there is a desire to obtain the ratings and reviews as rapidly as possible and to have the ratings and reviews authenticated. To this end, in one embodiment, ratings and reviews are obtained through "plug-in" sources such as through ratings fields provided in e-mails sent by the business wishing to obtain ratings and reviews or through ratings and review fields provided on the businesses website.

Figure 3:
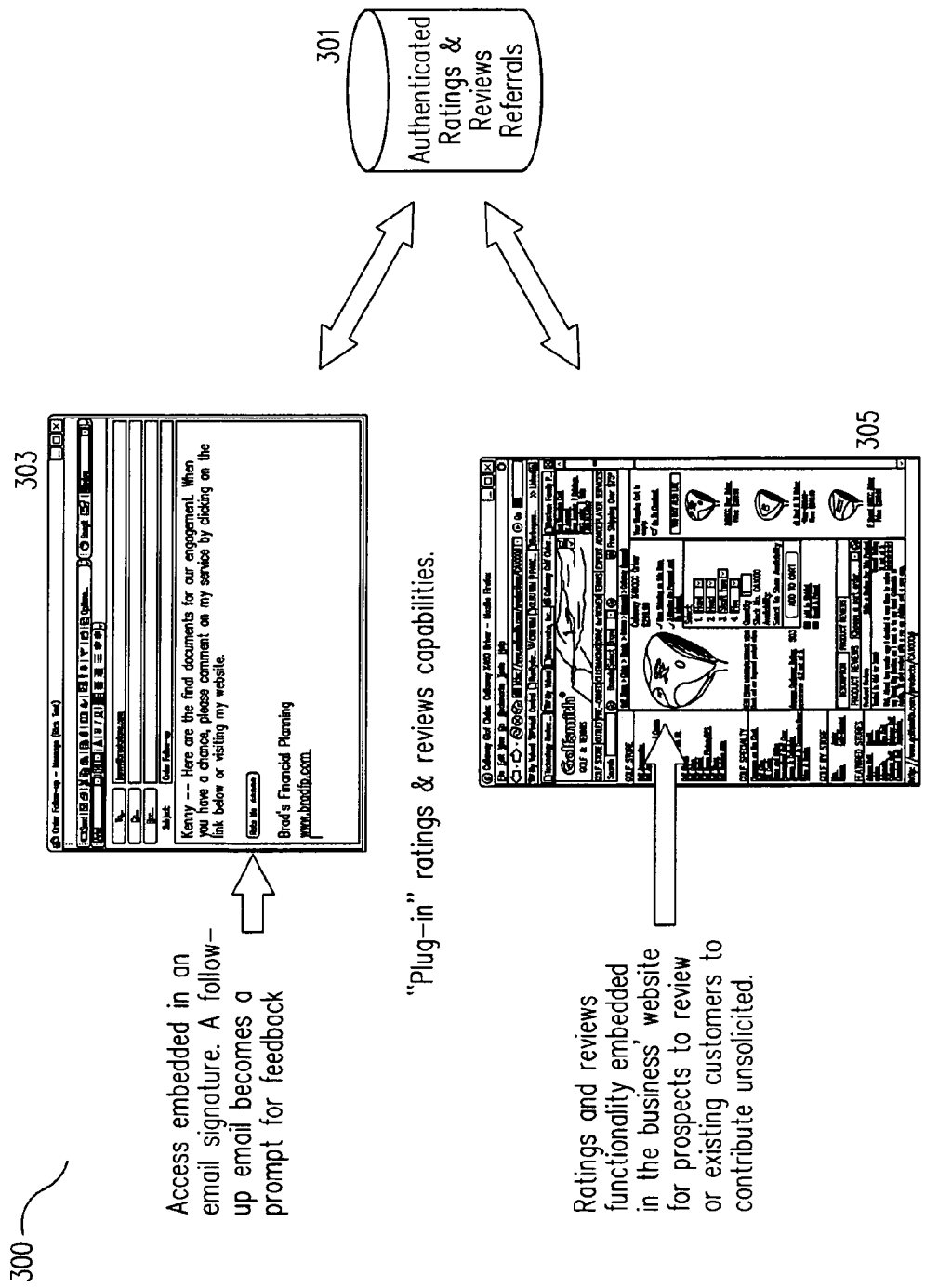
FIG. 3 shows a representation of one embodiment of an architecture for creating an authenticated rating and review/referral database in accordance with one embodiment.

FIG. 3 shows a representation of one embodiment of an architecture for creating an authenticated rating and review/referral database 300 in accordance with one embodiment. As shown in FIG. 3, and one embodiment, access to the authenticated rating and review/referral database provided at PROVIDE A AUTHENTICATED RATING AND REVIEW/REFERRAL DATABASE OPERATION 203. In one embodiment, the capability to submit reviews and/or ratings to the database is provided, through an e-mail 303 and/or through a business website 305.

Figure 4:
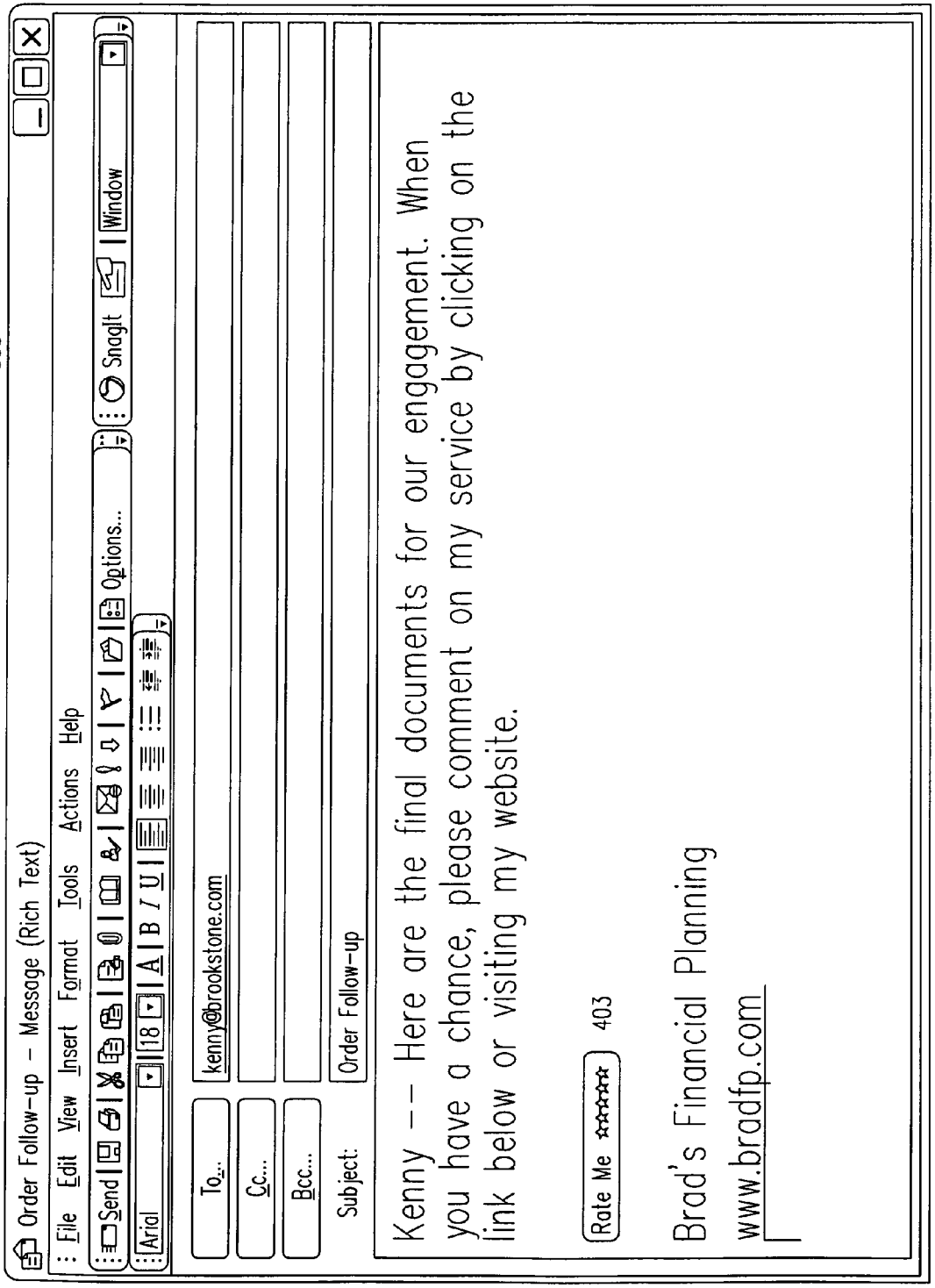
FIG. 4 shows a representation of an e-mail including an e-mail based rating link in accordance with one embodiment.

FIG. 4 shows a larger representation of e-mail 303 including embedded e-mail signature rating and review plug-in functionality 403. In one embodiment, a business wishing to obtain authenticated ratings and reviews provides a potential reviewer authenticated access to the authenticated rating and review/referral database 301 (FIG. 3) through rating and review plug-in functionality 403(FIG. 4). In this way, both the business and the provider of the authenticated rating and review/referral database can be relatively certain that a rating and/or review so submitted is a bona fide review from a bona fide customer of the business. In addition, an e-mail address and/or other identification information about the reviewer can also be obtained via this method.

Figure 5:
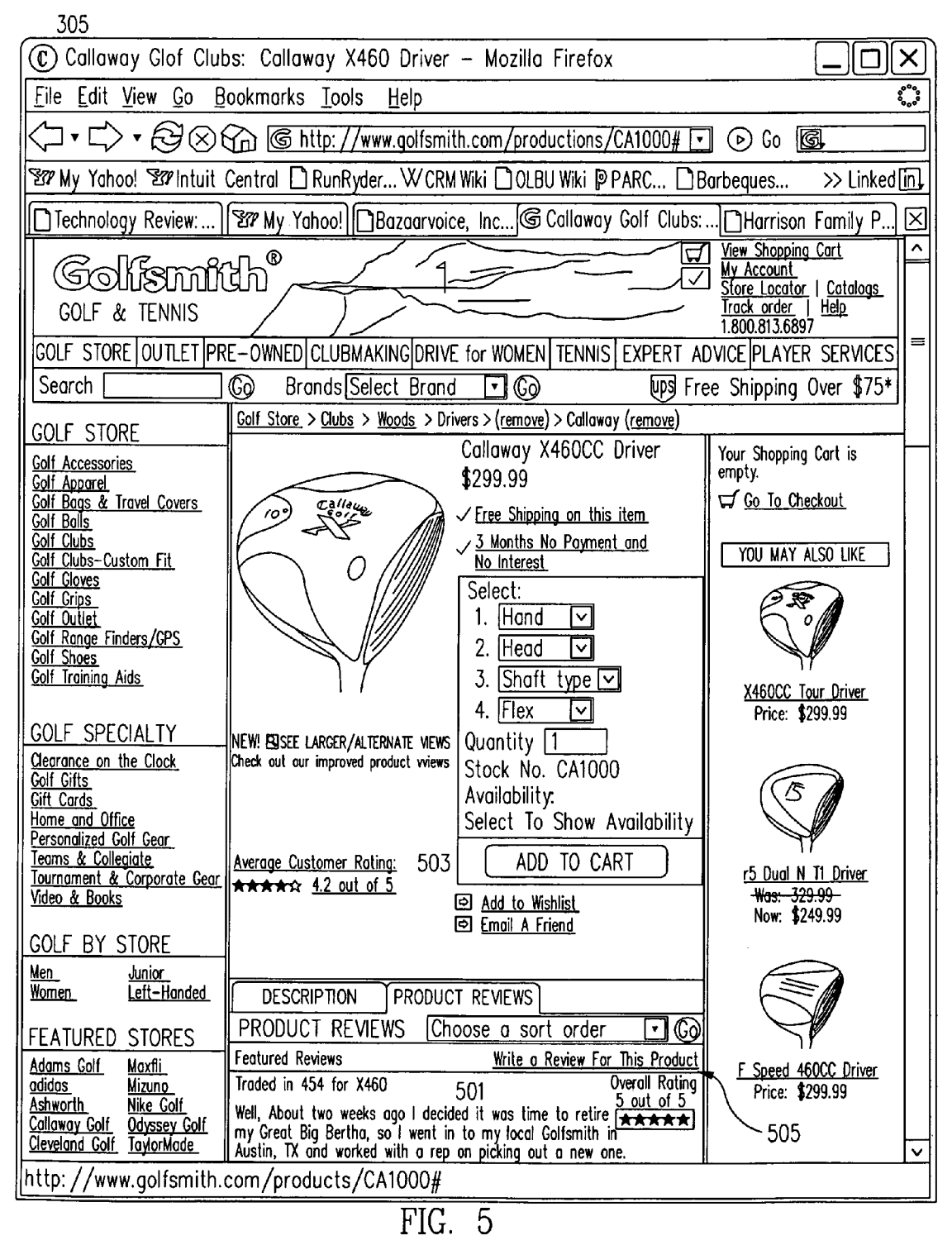

FIG. 5 shows a representation of a business website screen display 305 including rating and review plug-in functionality 505 in accordance with one embodiment. As seen in FIG. 5, website screen display 305 also includes featured review window 501 and overall rating 503, along with rating and review plug-in functionality 505. In this embodiment, a potential reviewer is provided access to authenticated rating and review/referral database 301 (FIG. 3) directly through the business website and the reviewer is provided the opportunity to submit an authenticated review within the context of the business website, without the need to access a separate ratings and review website.

In FIG. 4 and FIG. 5, the ratings and reviews, and overall ratings, shown are made up of stars. Those of skill in the art will recognize that while stars were chosen herein as representative symbols/displays, virtually any discrete symbol or symbols may be used. In addition, any singular symbol or graphical display capable of visually representing a rating may be used. As an example, a thermometer, a sliding scale, any graphical representation, or any partially filed figure or symbol, or outline thereof may be used. Moreover, these symbols, graphical displays, and scales may, in some embodiments, display either a level of satisfaction or dissatisfaction. Consequently the specific symbol of stars discussed herein was chosen for illustrative purposes only and does not limit the scope as claimed.

Those of skill in the art will also readily recognize that the choice of information displayed, the organization of the information displayed, and the manner in which the information is displayed in FIG. 4 and FIG. 5 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 4 and FIG. 5 are possible, and that the specific means discussed above do not limit the invention as set forth in the claims below.

In other embodiments, the ratings and reviews are obtained at OBTAIN USER RATINGS AND REVIEWS OF A BUSINESS OPERATION 205 through an existing rating and review system. As used herein, the term "rating and review system" refers to, but is not limited to, any means, method, mechanism, process, or product whereby users of the rating and review system can provide feedback regarding specific products, services, and/or businesses, and the ratings and reviews submitted by the individual users are displayed for viewing by other users. In one embodiment, the rating and review system is accessed through a website, or presence, on a network, such as the Internet or other private or public network, known to those of skill in the art at the time of filing and/or as developed thereafter. In one embodiment, the rating and review system is provided via a computer program product as defined herein.

In one embodiment, the rating and review system is sponsored/provided by a rating and review system provider such as, but not limited to: an independent organization formed specifically to offer a general rating and review system; individual retailers/resellers and/or conglomerates of retailers/resellers; a public and/or private organization and/or community offering a rating and review system directed to a specific topic, community, and/or product and service; and/or a membership and/or subscription driven organization and/or community offering a rating and review system to their members/subscribers as a membership/subscription benefit and/or service.

In one embodiment, the rating and review system is provided from, and/or operated from, and/or stored on, a server system, such as server system 120 of FIG. 1. In one embodiment, data associated with the rating and review system is stored on, or in, a database, such as database 170 of FIG. 1, by any one of the various means known to those of skill in the art and/or as discussed herein.

In one embodiment, the rating and review system includes a website and/or Internet access portal application such as website and/or Internet access portal application 180 of FIG. 1. In one embodiment, the rating and review system is a parent system for, and includes, process for linking businesses to customers through a trusted source network 200 as a function or module. In one embodiment, process for linking businesses to customers through a trusted source network 200 is a stand alone system.

Several rating and review systems are currently available and well known to those of skill in the art. In addition, methods for rating and review system creation, rating and review system operation, methods for providing a rating and review systems, and methods for accessing and transferring data representing ratings and reviews are also well known to those of skill in the art. Consequently, a more detailed discussion of methods for rating and review system creation, rating and review system operation, methods for implementing rating and review systems, and accessing and transferring data representing ratings and reviews is omitted here to avoid detracting from the invention.

As discussed in more detail below, in embodiments where the ratings and reviews are obtained from an existing rating and review system, using methods not under the direct control of process for linking businesses to customers through a trusted source network 200, the individual ratings and reviews must be authenticated by any one of several methods, means and/or mechanisms known to those of skill in the art.

In one embodiment, once ratings and/or reviews are obtained at OBTAIN USER RATINGS AND REVIEWS OF A BUSINESS OPERATION 205, process flow proceeds to AUTHENTICATE THE OBTAINED RATINGS AND REVIEWS OF THE BUSINESS OPERATION 207.

In one embodiment, at AUTHENTICATE THE OBTAINED RATINGS AND REVIEWS OF THE BUSINESS OPERATION 207 ratings and/or reviews are obtained at OBTAIN USER RATINGS AND REVIEWS OF A BUSINESS OPERATION 205 that did not originate from a known and authenticated source such as e-mail 303 and/or website 305 (FIG. 3), such as ratings and reviews obtained from an existing rating and review system, are authenticated. In one embodiment, authentication includes, but is not limited to, determining: the e-mail address of the reviewer; other identification associated with the reviewer; authentication of the identity of the reviewer via various authentication and/or digital certificates and/or mechanisms; requiring the reviewer to create, and then provide, a user name and password; contacting, through e-mail, phone, or other more conventional means, the reviewer to verify the reviewer's identification and motivation; and/or any other methods, means, and/or mechanisms for authenticating the identity and/or motivation of a reviewer as determined necessary by a provider of process for linking businesses to customers through a trusted source network 200 and/or the users of process for linking businesses to customers through a trusted source network 200, whether known and available at the time of filing or as develop thereafter.

As noted above, various methods, means, mechanisms, and processes for authenticating the identity of a reviewer and/or the validity of a rating and or review are known to those of skill in the art and the particular method, means, mechanism, and process will vary significantly from implementation-to-implementation and embodiment-to-embodiment. Consequently a more detailed discussion of the methods, means, mechanisms, and processes employed at AUTHENTICATE THE OBTAINED RATINGS AND REVIEWS OF THE BUSINESS OPERATION 207 is omitted here to avoid detracting from the invention.

In one embodiment, once the ratings and/or reviews obtained at OBTAIN USER RATINGS AND REVIEWS OF A BUSINESS OPERATION 205 are authenticated at AUTHENTICATE THE OBTAINED RATINGS AND REVIEWS OF THE BUSINESS OPERATION 207, process flow proceeds to TRANSFER THE RATINGS AND REVIEWS OF THE BUSINESS TO THE AUTHENTICATED RATING AND REVIEW/REFERRAL DATABASE OPERATION 209.

In one embodiment, at TRANSFER THE RATINGS AND REVIEWS OF THE BUSINESS TO THE AUTHENTICATED RATING AND REVIEW/REFERRAL DATABASE OPERATION 209 data representing the individual ratings and/or reviews obtained at OBTAIN USER RATINGS AND REVIEWS OF A BUSINESS OPERATION 205 and authenticated at AUTHENTICATE THE OBTAINED RATINGS AND REVIEWS OF THE BUSINESS OPERATION 207 is transferred to the authenticated rating and review/referral database provided at PROVIDE A AUTHENTICATED RATING AND REVIEW/REFERRAL DATABASE OPERATION 203, such as authenticated rating and review/referral database 301 of FIG. 3.

In one embodiment, the data representing the ratings and reviews is transferred to the authenticated rating and review/referral database through an interface that is created/provided upon activation of an embedded e-mail signature rating and review plug-in functionality, such as 403 of e-mail 303 (FIG. 4) and/or activation of a rating and review plug-in functionality of a business website screen display such as 505 of business website screen display 305 (FIG. 5), on the reviewer's computing system and/or device by one of numerous mechanisms known to those of skill in the art.

In one embodiment, the data representing the ratings and reviews is transferred to the authenticated rating and review/referral database by any one of numerous methods, means, mechanisms and apparatuses for transferring data between two computing systems, databases, server systems, websites, and/or networks, known to those of skill in the art at the time of filing and/or as developed later. In one embodiment, the data representing the ratings and reviews is transferred to the authenticated rating and review/referral database over the Internet, or other private or public network, such as network 130 of FIG. 1.

Returning to FIG. 2, in one embodiment, once the data representing the ratings and reviews is transferred to the authenticated rating and review/referral database at TRANSFER THE RATINGS AND REVIEWS OF THE BUSINESS TO THE AUTHENTICATED RATING AND REVIEW/REFERRAL DATABASE OPERATION 209, process flow proceeds to PROVIDE ACCESS TO THE AUTHENTICATED RATING AND REVIEW/REFERRAL DATABASE THROUGH ONE OR MORE WEBSITES OPERATION 211.

In one embodiment, at PROVIDE ACCESS TO THE AUTHENTICATED RATING AND REVIEW/REFERRAL DATABASE THROUGH ONE OR MORE WEBSITES OPERATION 215, one or more websites are provided access to the authenticated rating and review/referral database, and the authenticated ratings and reviews. In one embodiment, this includes a website associated with the business being reviewed.

Figure 6:
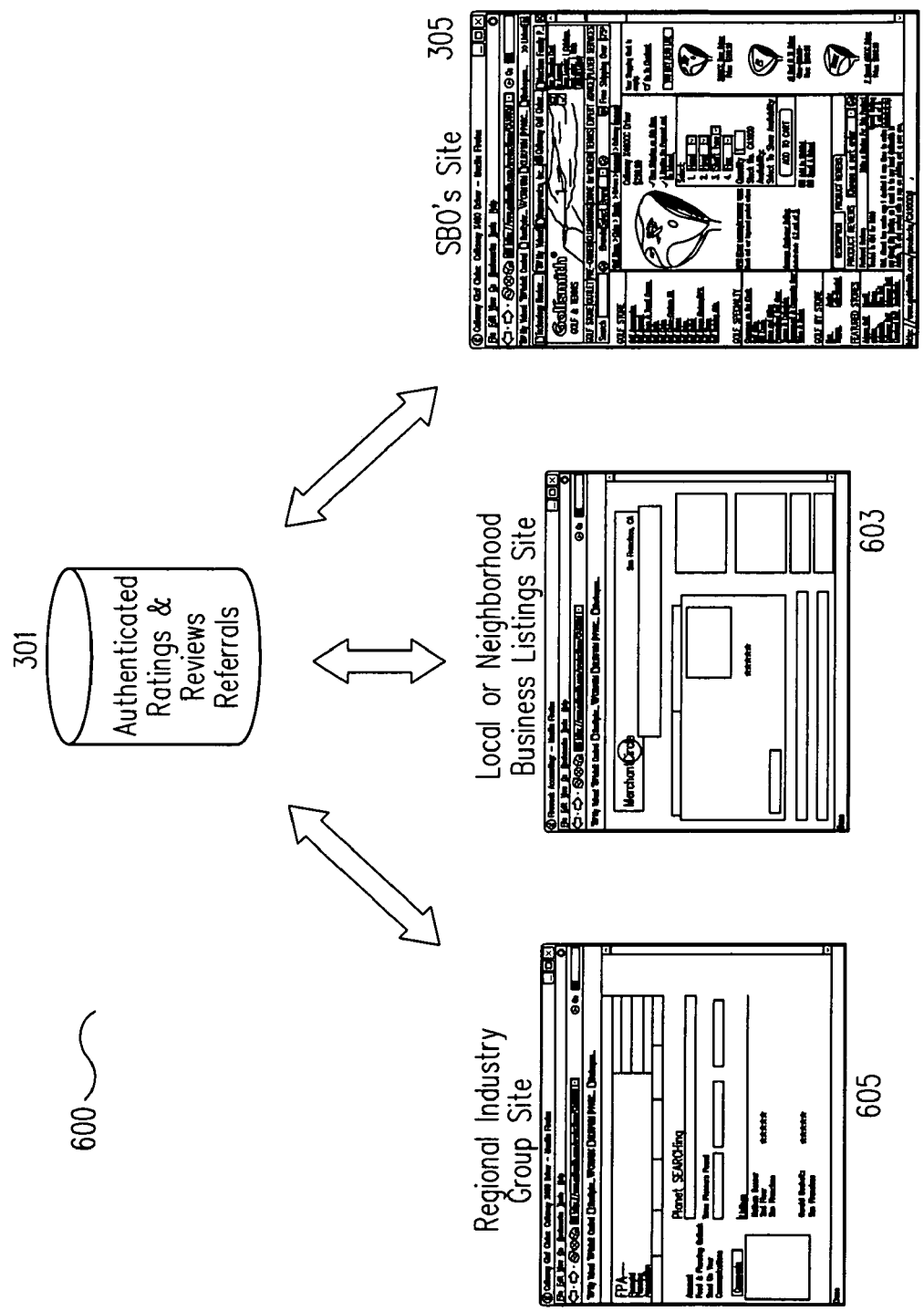
FIG. 6 shows a representation of one embodiment of a trusted source network implemented using one embodiment of the process for linking businesses to customers through a trusted source network of FIG. 2.

FIG. 6 shows a representation of one embodiment of trusted source network 600 implemented using one embodiment of process for linking businesses to customers through a trusted source network 200.

As seen in FIG. 6, in one embodiment, trusted source network 600 includes authenticated rating and review/referral database 301, business website 305, first third party website 603 and second third party website 605. In one embodiment, first third party website 603 is a local and/or neighborhood business listing site, which, in one embodiment may also serve as a ratings and review portal for local businesses. In one embodiment, second third party website 605 is an industry group website which also, in one embodiment, may provide a ratings and reviews service as well as various forums associated with the field of business website 305.

In one embodiment, business website 305, first third party website 603, and second third party website 605 are all linked to authenticated rating and review/referral database 301 through the websites themselves. Consequently, in one embodiment a user/potential customer is given access to the authenticated reviews associated with a particular business within the context of the currently viewed website.

Using process for linking businesses to customers through a trusted source network 200 (FIG. 2), there is one common architecture behind all of the ratings and reviews, i.e., the architecture associated with authenticated rating and review/referral database 301 (FIG. 6). In addition, in one embodiment, authenticated rating and review/referral database 301 is a normalized database. Consequently, authenticated ratings and reviews are made available to any website that is linked to authenticated rating and review/referral database 301 and is therefore part of trusted source network 600. Therefore, the authenticated ratings and reviews of authenticated rating and review/referral database 301 are readily accessible and "portable".

Returning to FIG. 2, in one embodiment, once one or more websites are provided access to the authenticated rating and review/referral database at PROVIDE ACCESS TO THE AUTHENTICATED RATING AND REVIEW/REFERRAL DATABASE THROUGH ONE OR MORE WEBSITES OPERATION 215, process flow proceeds to END OPERATION 231 and process for linking businesses to customers through a trusted source network 200 is exited.

Using process for linking businesses to customers through a trusted source network 200, a business is provided with the immediate benefit of being able to easily start collecting authenticated ratings and reviews from their customers and these authenticated ratings and reviews are easily distributed to one or more other websites since the source of the ratings and reviews is the central authenticated rating and review/referral database. Consequently, businesses are not only provided with an opportunity to increase their exposure to potential clients/customers, but they also can collect ratings and reviews from a wider audience. In addition, at a minimum, a potential customer/user is provided with authenticated ratings and reviews from authenticated sources so that, at a minimum, the potential customer is at least assured that a given rating or review is a bona fide rating and/or review.

In one embodiment the authenticated rating and review/referral database is linked to a networked community such that the authenticated ratings and reviews are provided to the networked community members through the networked community network and/or website. In one embodiment, the authenticated ratings and reviews are screened and only ratings and reviews submitted from members of the networked community, either through the networked community website, or through third-party sources, are provided to members of the networked community.

Figure 7:
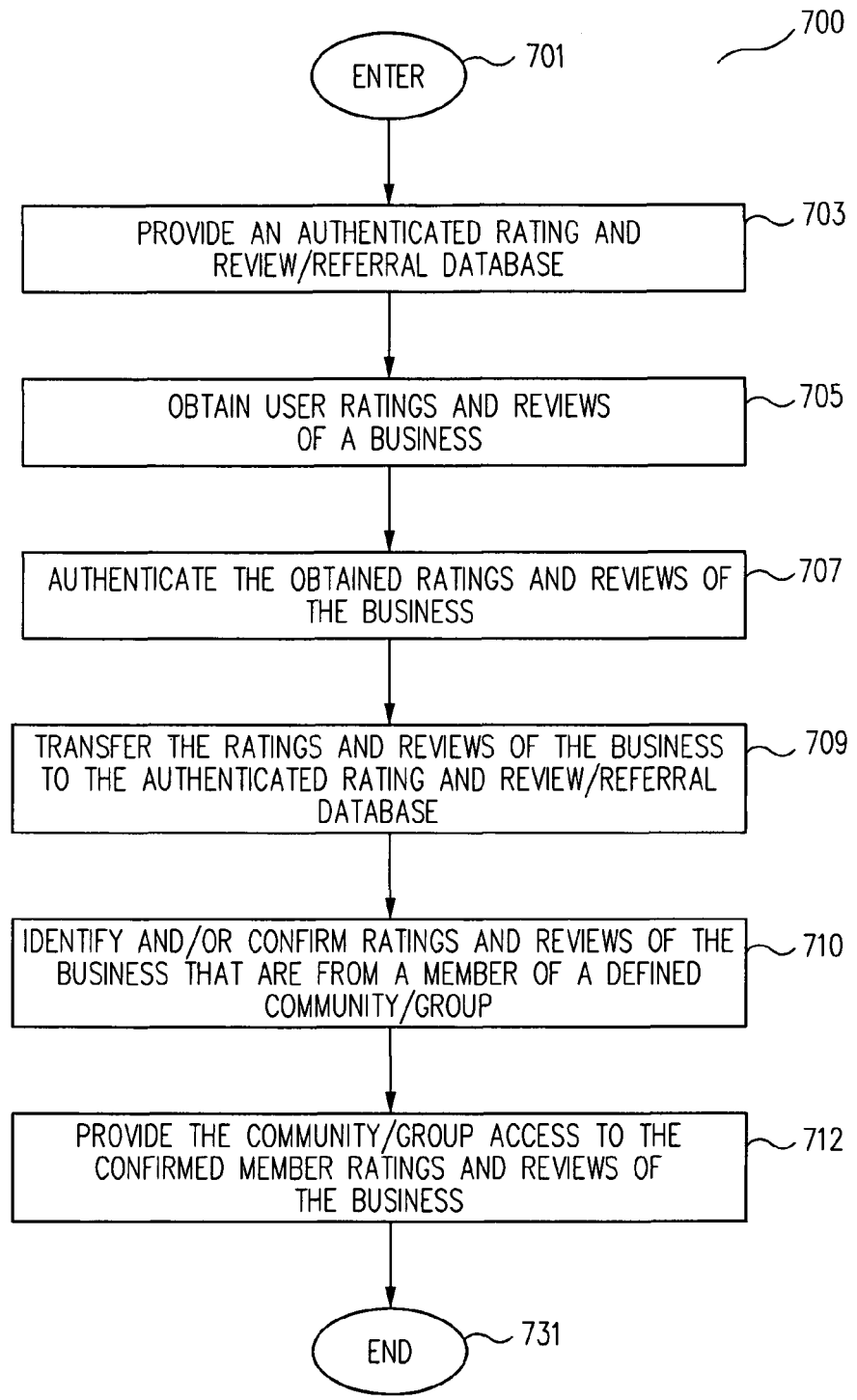
FIG. 7 is a flow chart depicting a process for linking businesses to customers through a trusted source network in accordance with one embodiment.

FIG. 7 is a flow chart depicting a process for linking businesses to customers through a trusted source network 700 in accordance with one embodiment. Process for linking businesses to customers through a trusted source network 700 begins at ENTER OPERATION 701 and process flow proceeds to PROVIDE A AUTHENTICATED RATING AND REVIEW/REFERRAL DATABASE OPERATION 703.

In one embodiment: PROVIDE A AUTHENTICATED RATING AND REVIEW/REFERRAL DATABASE OPERATION 703; OBTAIN USER RATINGS AND REVIEWS OF A BUSINESS OPERATION 705; AUTHENTICATE THE OBTAINED RATINGS AND REVIEWS OF THE BUSINESS OPERATION 707; and TRANSFER THE RATINGS AND REVIEWS OF THE BUSINESS TO THE AUTHENTICATED RATING AND REVIEW/REFERRAL DATABASE OPERATION 709 of process for linking businesses to customers through a trusted source network 700 are substantially the same as similarly named and numbered operations discussed above with respect to FIG. 2, and process for linking businesses to customers through a trusted source network 200. Consequently, the discussion above with respect to FIG. 2, and the similarly named and numbered operations of process for linking businesses to customers through a trusted source network 200, is applicable to, and incorporated here for, process for linking businesses to customers through a trusted source network 700.

In one embodiment, once the data representing the ratings and reviews is transferred to the authenticated rating and review/referral database at TRANSFER THE RATINGS AND REVIEWS OF THE BUSINESS TO THE AUTHENTICATED RATING AND REVIEW/REFERRAL DATABASE OPERATION 709, process flow proceeds to IDENTIFY AND/OR CONFIRM RATINGS AND REVIEWS OF THE BUSINESS THAT ARE FROM A MEMBER OF A DEFINED COMMUNITY/GROUP OPERATION 710.

In one embodiment, at IDENTIFY AND/OR CONFIRM RATINGS AND REVIEWS OF THE BUSINESS THAT ARE FROM A MEMBER OF A DEFINED COMMUNITY/GROUP OPERATION 710 a community or group of users is identified and/or defined and then the authenticated ratings and reviews transferred to the authenticated rating and review/referral database at TRANSFER THE RATINGS AND REVIEWS OF THE BUSINESS TO THE AUTHENTICATED RATING AND REVIEW/REFERRAL DATABASE OPERATION 709 are scanned to identify and/or confirm ratings and reviews submitted by members of the defined community or group.

In one embodiment, the community or group is one of several established networked communities such as, but not limited to: Yahoo Groups®; Linkedin®; myspace.com®; any one of numerous networked communities based on location, profession, politics, religion, or any other attribute bringing two or more people together via a network; and/or any other public or private community or group.

In one embodiment, once the community or group is defined, the process of identifying and/or confirming ratings and reviews that are submitted by members of the community or group is accomplished by directly linking to a website associated with the community or group and then allowing members to submit ratings or reviews directly through the community or group website. In this way, the source of the review, i.e., the website for the community or group, is the mechanism for authenticating that the rating or review is coming from a member of the community or group.

In other embodiments, and, in particular, in embodiments where the ratings and reviews are obtained, at least in part, from a third-party rating and review system, or from any other non-community or group source, the particular ratings and reviews that were submitted by members of the community or group must be identified through another mechanism known to those of skill the art.

For instance, in one embodiment, as discussed above at AUTHENTICATE THE OBTAINED RATINGS AND REVIEWS OF THE BUSINESS OPERATION 707 the e-mail address of the reviewer submitting a given rating or review is obtained. Then, in one embodiment, a listing of all of the e-mail addresses for members of the community or group is obtained. Then all ratings and reviews are scanned and ratings and reviews having reviewer e-mail addresses matching one of the member e-mail addresses is identified and confirmed as a rating and/or review submitted by a member of the community. In other embodiments, anyone of numerous other mechanisms for identifying a rating and/or review submitted by a member of the community is used to identify and confirm that a given rating or review is indeed from a member of the community or group.

In one embodiment, once a community or group is identified and/or defined, and a mechanism is put in place for identifying and/or confirming reviews and/or ratings submitted by members of the community or group at IDENTIFY AND/OR CONFIRM RATINGS AND REVIEWS OF THE BUSINESS THAT ARE FROM A MEMBER OF A DEFINED COMMUNITY/GROUP OPERATION 710, process flow proceeds to PROVIDE THE COMMUNITY/GROUP ACCESS TO THE CONFIRMED MEMBER RATINGS AND REVIEWS OF THE BUSINESS OPERATION 712.

In one embodiment, at PROVIDE THE COMMUNITY/GROUP ACCESS TO THE CONFIRMED MEMBER RATINGS AND REVIEWS OF THE BUSINESS OPERATION 712 the community or group defined at IDENTIFY AND/OR CONFIRM RATINGS AND REVIEWS OF THE BUSINESS THAT ARE FROM A MEMBER OF A DEFINED COMMUNITY/GROUP OPERATION 710 is provided access to authenticated ratings and reviews submitted by members of the community or group to the authenticated rating and review/referral database.

In one embodiment, access to the authenticated ratings and reviews submitted by members of the community or group is provided through a link and/or portal residing on the community's or group's website. In this way, members of the community or group can access ratings and reviews submitted by other members of the community or group directly through the community's or group's website. Consequently, the users/member is provided with the security of never having left the trusted community website and therefore a higher sense of trust is conveyed to the user/member.

Figure 8:
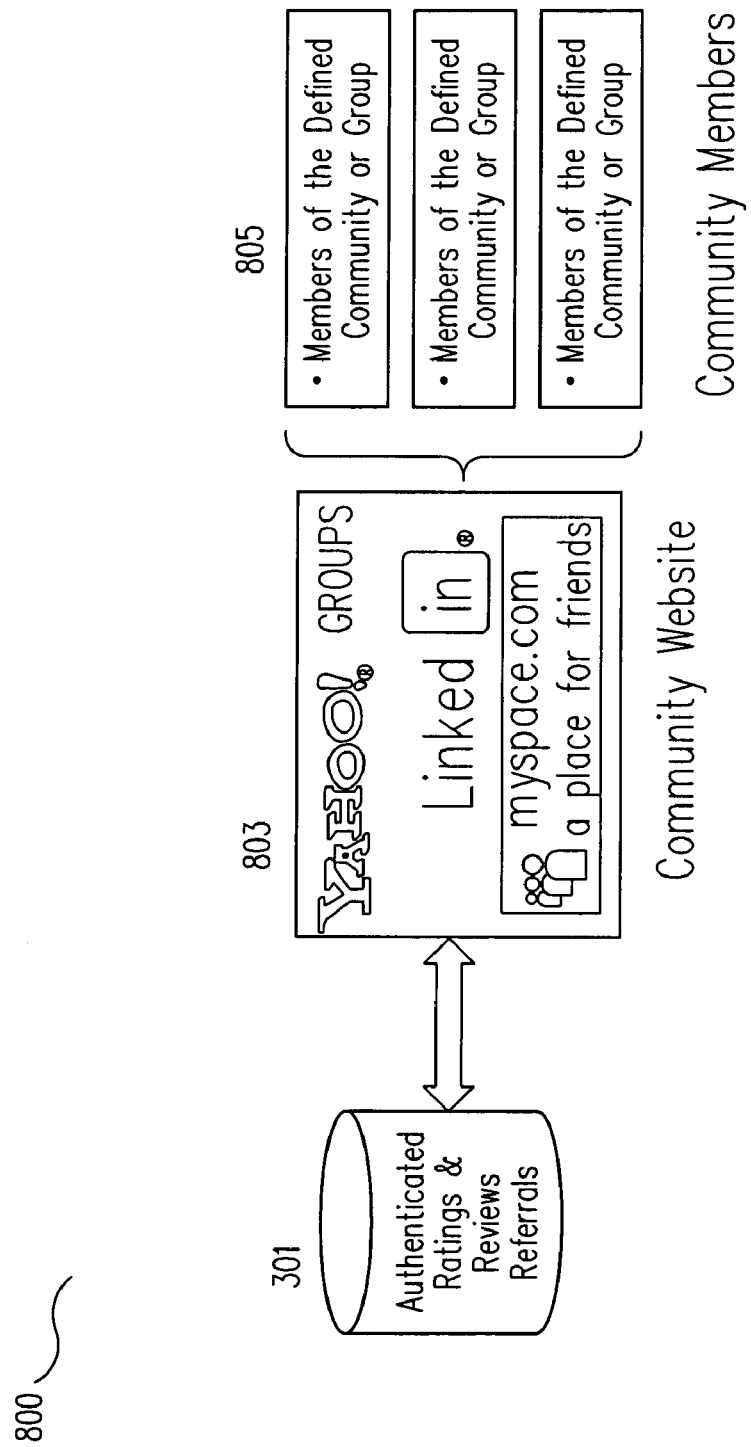
FIG. 8 shows a representation of one embodiment of a trusted source network implemented using one embodiment of the process for linking businesses to customers through a trusted source network of FIG. 7.

FIG. 8 shows a representation of one embodiment of a trusted source network 800 implemented using one embodiment of process for linking businesses to customers through a trusted source network 700 of FIG. 7.

As seen in FIG. 8, in one embodiment, trusted source network 800 includes members 805 linked to a community or group website 803. In one embodiment, the link between members 805 and the community or group website 803 is accomplished via a community website access application, such as networked community access application 190 (FIG. 1) and/or a website/Internet access portal, such as website and/or Internet access portal applications 180. As also shown in FIG. 8, community or group website 803 is linked to all, or part of, authenticated rating and review/referral database 301 as described above.

Returning to FIG. 7, in one embodiment, once the community or group defined at IDENTIFY AND/OR CONFIRM RATINGS AND REVIEWS OF THE BUSINESS THAT ARE FROM A MEMBER OF A DEFINED COMMUNITY/GROUP OPERATION 710 is provided access to authenticated ratings and reviews submitted by members of the community or group to the authenticated rating and review/referral database at PROVIDE THE COMMUNITY/GROUP ACCESS TO THE CONFIRMED MEMBER RATINGS AND REVIEWS OF THE BUSINESS OPERATION 712 process flow proceeds to END OPERATION 731 and process for linking businesses to customers through a trusted source network 700 is exited.

Using process for linking businesses to customers through a trusted source network 700, the authenticated rating and review/referral database is linked to one or more networked communities and the potential customers/members of the networked community are, in one embodiment, provided only with ratings and reviews submitted by other members of the networked community and, therefore, the potential customer/member is provided with a sense of receiving a recommendation from, if not a trusted source/contact, at least a source/contact having a similar lifestyle, attributes, values, and/or needs. In addition, in one embodiment, the authenticated rating and review/referral database, and the authenticated ratings and reviews, are accessed directly through the networked community's website so that the potential customer/member feels they are never leaving their trusted community.

In one embodiment, business-to-business referrals are made through businesses and/or business websites into the authenticated rating and review/referral database. In one embodiment, the authenticated rating and review/referral database is then used to create a business-to-business referral network based on the authenticated referrals submitted by the specific businesses. In other embodiments, an existing business-to-business referral network is linked to the authenticated rating and review/referral database and the members of the business-to-business referral network are provided access to the authenticated ratings in reviews in the authenticated rating and review/referral database.

Figure 9:
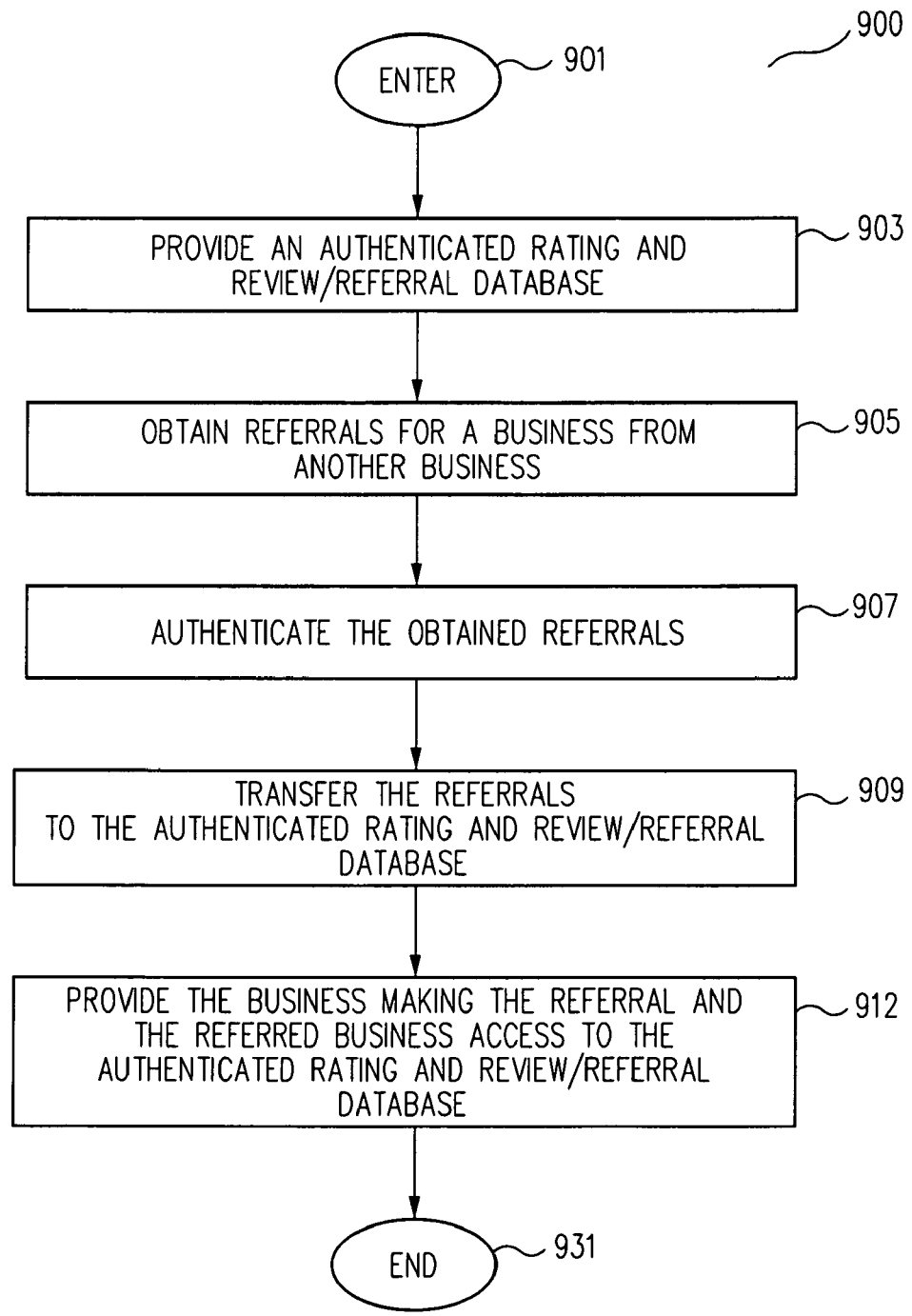
FIG. 9 is a flow chart depicting a process for linking businesses to customers through a trusted source network in accordance with one embodiment.

FIG. 9 is a flow chart depicting a process for linking businesses to customers through a trusted source network 900 in accordance with one embodiment. Process for linking businesses to customers through a trusted source network 900 begins at ENTER OPERATION 901 and process flow proceeds to PROVIDE AN AUTHENTICATED RATING AND REVIEW/REFERRAL DATABASE OPERATION 903.

In one embodiment: PROVIDE AN AUTHENTICATED RATING AND REVIEW/REFERRAL DATABASE OPERATION 903; OBTAIN REFERRALS FOR A BUSINESS FROM ANOTHER BUSINESS OPERATION 905; AUTHENTICATE THE OBTAINED REFERRALS OPERATION 907; and TRANSFER THE REFERRALS TO THE AUTHENTICATED RATING AND REVIEW/REFERRAL DATABASE OPERATION 909 of process for linking businesses to customers through a trusted source network 900 are substantially the same as similarly named and numbered operations discussed above with respect to FIG. 2, and process for linking businesses to customers through a trusted source network 200. However, instead of being directed to obtaining and processing ratings and/or reviews submitted by individual reviewers, as was the case with process for linking businesses to customers through a trusted source network 200, process for linking businesses to customers through a trusted source network 900 is directed to obtaining and processing referrals to a given business made by another business, i.e., business-to-business referrals. Since this is only a matter of manipulating a different type of data and, in essence, just a different type of ratings and/or review from a different type of reviewer, the discussion above with respect to FIG. 2, and the similarly named and numbered operations of process for linking businesses to customers through a trusted source network 200, is applicable to, and incorporated here for, process for linking businesses to customers through a trusted source network 900.

In one embodiment, once the data representing the business-to-business referrals is transferred to the authenticated rating and review/referral database at TRANSFER THE REFERRALS TO THE AUTHENTICATED RATING AND REVIEW/REFERRAL DATABASE OPERATION 909, process flow proceeds to PROVIDE THE BUSINESS MAKING THE REFERRAL AND THE REFERRED BUSINESS ACCESS TO THE AUTHENTICATED RATING AND REVIEW/REFERRAL DATABASE OPERATION 912.

In one embodiment at PROVIDE THE BUSINESS MAKING THE REFERRAL AND THE REFERRED BUSINESS ACCESS TO THE AUTHENTICATED RATING AND REVIEW/REFERRAL DATABASE OPERATION 912 one or more business websites are provided access to the authenticated rating and review/referral database and the authenticated referrals. In one embodiment, this includes the websites associated with the business being referred and the referring business.

Figure 10:
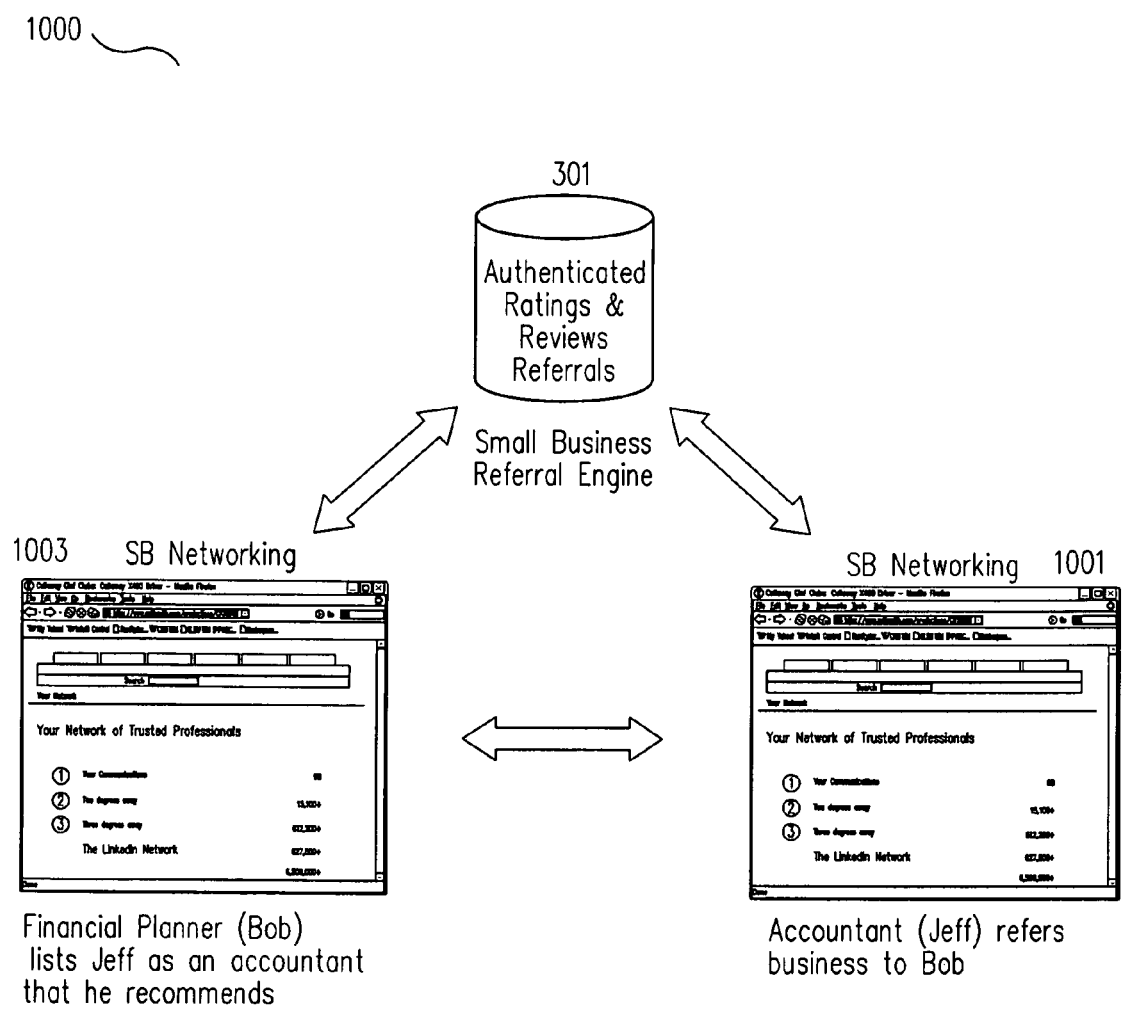
FIG. 10 shows a representation of one embodiment of a trusted source network implemented using one embodiment of the process for linking businesses to customers through a trusted source network of FIG. 9.

FIG. 10 shows a representation of one embodiment of trusted source network 1000 implemented using one embodiment of process for linking businesses to customers through a trusted source network 1000.

As seen in FIG. 10, in one embodiment, trusted source network 1000 includes authenticated rating and review/referral database 301, referring business website 1001, and referred business website 1003. In this particular example, referring business website 1001 is associated with an accountant named Jeff who refers business to a financial planner named Bob. Referred business website 1003, in turn, then lists Jeff as a referred accountant, the referral now coming from Bob and referred website 1003 to Jeff and referral website 1001. Consequently, by virtue of even this single referral, both Bob and Jeff are now part of a business-to-business referral network consisting of referring business website 1001 and referred business website 1003.

As also seen in FIG. 10, in one embodiment, referring business website 1001 and referred business website 1003 are, in addition to being linked to each other, both linked to authenticated rating and review/referral database 301 through the websites themselves. Since, using process 900 (FIG. 9), there is one common architecture behind all of the ratings and reviews, i.e., the architecture associated with authenticated rating and review/referral database 301 authenticated referrals are made available to any business website that is linked to authenticated rating and review/referral database 301, and therefore a member of trusted source network 1000 (FIG. 10). Consequently, the authenticated referrals of authenticated rating and review/referral database 301 are readily accessible and "portable".

Returning to FIG. 9, in one embodiment, once referring business website 1001 and referred business website 1003 (FIG. 10) are networked and given access to the authenticated rating and review/referral database at PROVIDE THE BUSINESS MAKING THE REFERRAL AND THE REFERRED BUSINESS ACCESS TO THE AUTHENTICATED RATING AND REVIEW/REFERRAL DATABASE OPERATION 912 (FIG. 9), process flow proceeds to END OPERATION 931 and process for linking businesses to customers through a trusted source network 900 is exited.

Using process for linking businesses to customers through a trusted source network 900 the authenticated rating and review/referral database is used to link businesses for business-to-business referrals and to form business-to-business referral networks. Consequently, the businesses are exposed to potential new clients through the trusted and authenticated ratings and reviews/referrals of the authenticated rating and review/referral database. Consequently, the businesses are strongly motivated to utilize the resultant network as a means of increasing the range of their own network of contacts.

In one embodiment, two or more of the trusted source networks discussed above are connected through the centralized authenticated rating and review/database database to create a multi-component trusted source network based on the authenticated ratings and reviews and/or referrals of the authenticated rating and review/referral database. In one embodiment, all of the networks discussed above are connected into a single trusted source network.

Figure 11:
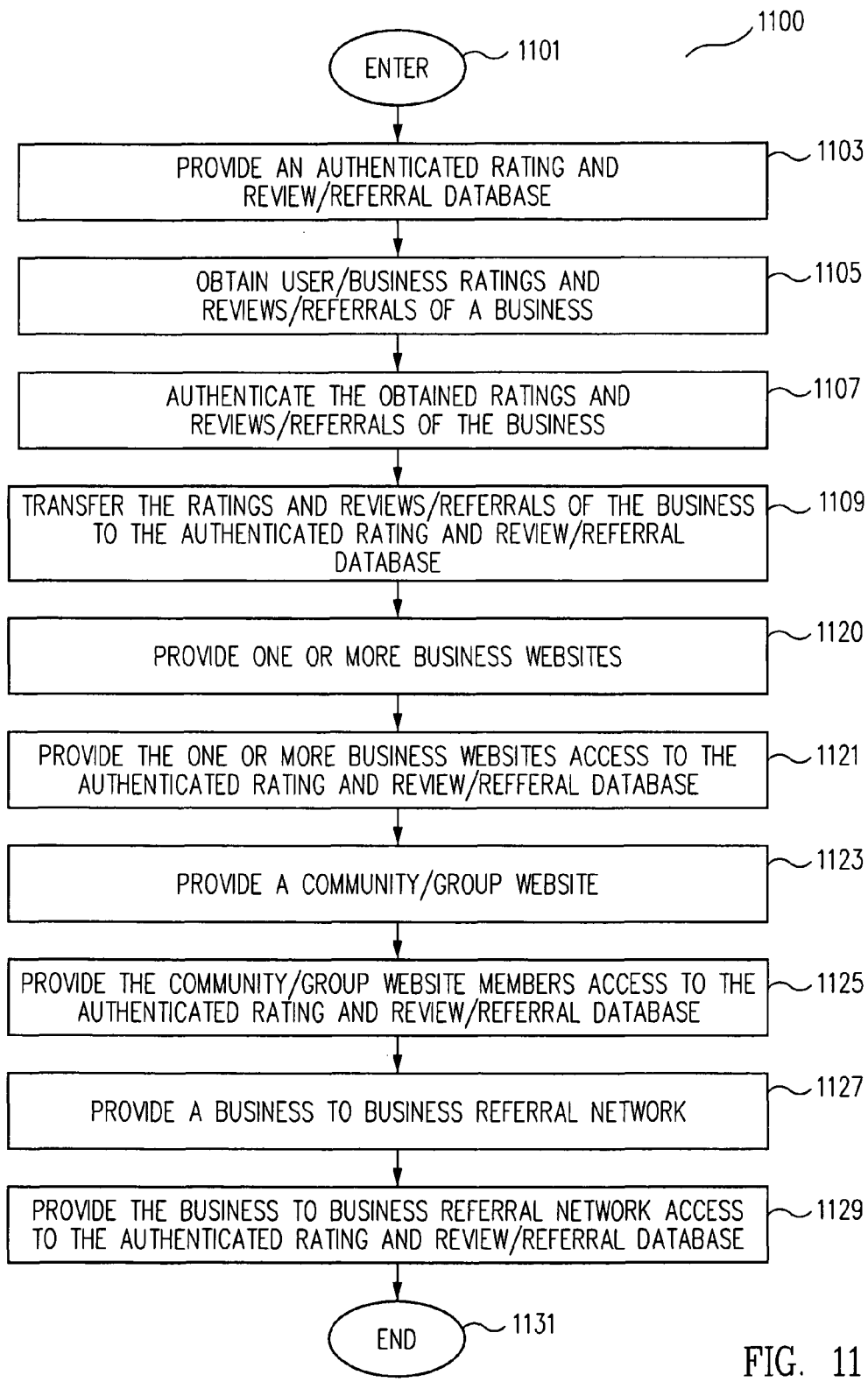
FIG. 11 is a flow chart depicting a process for linking businesses to customers through a trusted source network in accordance with one embodiment.

FIG. 11 is a flow chart depicting a process for linking businesses to customers through a trusted source network 1100 in accordance with one embodiment. Process for linking businesses to customers through a trusted source network 1100 begins at ENTER OPERATION 1101 and process flow proceeds to PROVIDE AN AUTHENTICATED RATING AND REVIEW/REFERRAL DATABASE OPERATION 1103

In one embodiment: PROVIDE AN AUTHENTICATED RATING AND REVIEW/REFERRAL DATABASE OPERATION 1103; OBTAIN USER/BUSINESS RATINGS AND REVIEWS/REFERRALS OF A BUSINESS OPERATION 1105; AUTHENTICATE THE OBTAINED RATINGS AND REVIEWS/REFERRALS OF THE BUSINESS OPERATION 1107; TRANSFER THE RATINGS AND REVIEWS/REFERRALS OF THE BUSINESS TO THE AUTHENTICATED RATING AND REVIEW/REFERRAL DATABASE OPERATION 1109; of process for linking businesses to customers through a trusted source network 1100 are substantially the same as similarly named and numbered operations discussed above with respect to FIG. 2, and process for linking businesses to customers through a trusted source network 200. Consequently, the discussion above with respect to FIG. 2, and the similarly named and numbered operations of process for linking businesses to customers through a trusted source network 200, is applicable to, and incorporated here for, process for linking businesses to customers through a trusted source network 1100.

In one embodiment, once the data representing the ratings and reviews/referrals is transferred to the authenticated rating and review/referral database at TRANSFER THE RATINGS AND REVIEWS/REFERRALS OF THE BUSINESS TO THE AUTHENTICATED RATING AND REVIEW/REFERRAL DATABASE OPERATION 1109, process flow proceeds to; PROVIDE ONE OR MORE BUSINESS WEBSITES OPERATION 1114.

In one embodiment, at PROVIDE ONE OR MORE BUSINESS WEBSITES OPERATION 1114, one more business websites such as business website 305, first third party website 603, and second third party website 605 of FIG. 6 are provided.

Returning to FIG. 11, in one embodiment, these one or more business websites are provided access to the authenticated rating and review/referral database of PROVIDE AN AUTHENTICATED RATING AND REVIEW/REFERRAL DATABASE OPERATION 1103 at PROVIDE THE ONE OR MORE BUSINESS WEBSITES ACCESS TO THE AUTHENTICATED RATING AND REVIEW/REFERRAL DATABASE OPERATION 1115 as discussed above with respect to FIG. 2, via any one of the numerous methods for connecting two or more computing systems, databases, websites, web functions, and/or computer program products known to those of skill in the art, and/or as discussed herein, whether no one at the time of filing or is developed thereafter.

In one embodiment, once one or more business websites are provided and linked to the authenticated rating and review/referral database at PROVIDE ONE OR MORE BUSINESS WEBSITES OPERATION 1114 and PROVIDE THE ONE OR MORE BUSINESS WEBSITES ACCESS TO THE AUTHENTICATED RATING AND REVIEW/REFERRAL DATABASE OPERATION 1115, process flow proceeds to PROVIDE A COMMUNITY/GROUP WEBSITE OPERATION 1120.

In one embodiment, at PROVIDE A COMMUNITY/GROUP WEBSITE OPERATION 1120 a website associated with the community or group, such as the community or group discussed above with respect to IDENTIFY AND/OR CONFIRM RATINGS AND REVIEWS OF THE BUSINESS THAT ARE FROM A MEMBER OF A DEFINED COMMUNITY/GROUP OPERATION 710 of FIG. 7, is provided and members of the community or group are provided access to the authenticated rating and review/referral database at PROVIDE THE COMMUNITY/GROUP MEMBERS ACCESS TO THE AUTHENTICATED RATING AND REVIEW/REFERRAL DATABASE OPERATION 1122 (FIG. 11) by any of the means, mechanisms, methods, and/or processes well known to those of skill in the art and or as discussed above with respect to PROVIDE THE COMMUNITY/GROUP ACCESS TO THE CONFIRMED MEMBER RATINGS AND REVIEWS OF THE BUSINESS OPERATION 712 (FIG. 7).

Returning to FIG. 11, in one embodiment, once a community or group website is provided at PROVIDE A COMMUNITY/GROUP WEBSITE OPERATION 1120, and members of the community or group are given access to at least a portion of the authenticated rating and review/referral database at PROVIDE THE COMMUNITY/GROUP MEMBERS ACCESS TO THE AUTHENTICATED RATING AND REVIEW/REFERRAL DATABASE OPERATION 1122, process flow proceeds to PROVIDE A BUSINESS TO BUSINESS REFERRAL NETWORK OPERATION 1124.

In one embodiment, at PROVIDE A BUSINESS TO BUSINESS REFERRAL NETWORK OPERATION 1124 a business-to-business referral network, such as discussed above with respect FIG. 9 is enabled and/or provided and the business to business referral network is given access to the authenticated rating and review/referral database at PROVIDE THE BUSINESS TO BUSINESS REFERRAL NETWORK ACCESS TO THE AUTHENTICATED RATING AND REVIEW/REFERRAL DATABASE OPERATION 1126 (FIG. 11) by any of the means discussed above with respect to FIG. 9.

Figure 12:
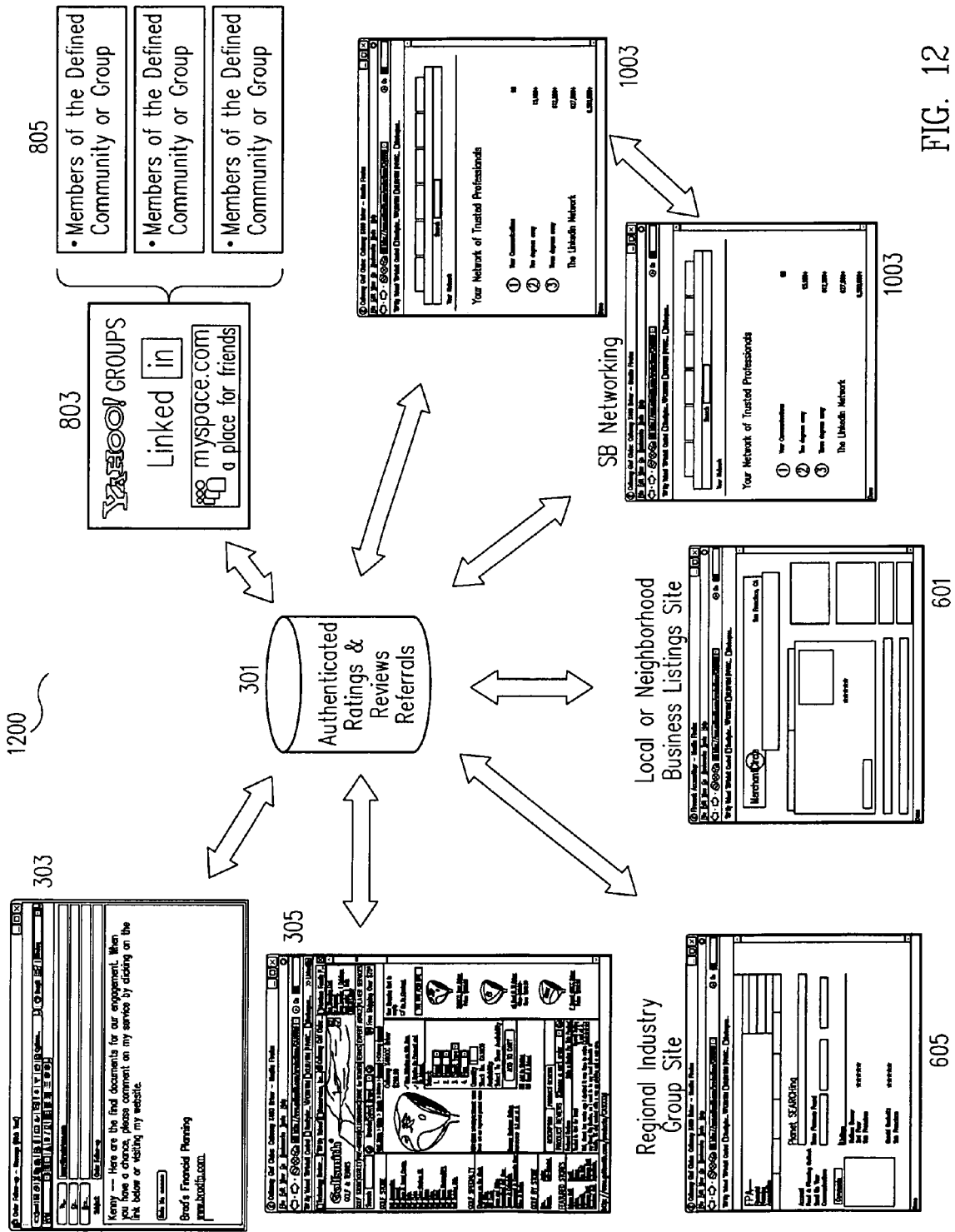
FIG. 12 shows a representation of one embodiment of a trusted source network implemented using one embodiment of the process for linking businesses to customers through a trusted source network of FIG. 12 in accordance with one embodiment.

FIG. 12 shows a representation of one embodiment of multi-component trusted source network 1200 implemented using one embodiment of process for linking businesses to customers through a trusted source network 1100. Shown in FIG. 12 is each of the elements discussed above with respect to FIG. 2, FIG. 3, FIG. 4, FIG. 5, FIG. 6, FIG. 7, FIG. 8, FIG. 9, and FIG. 10, all linked together by the means and methods disclosed herein, in a single multi-component trusted source network with authenticated rating and review/referral database 301 acting as the centralized hub.

Using process for linking businesses to customers through a trusted source network 1100 one or more of the various trusted networks and/or elements discussed above are brought together through the authenticated rating and review/referral database. As a result, relatively large-scale multi-source and/or multi-component trusted source networks are created that have the potential to provide most of the benefits of the old word-of-mouth networks while at the same time eliminating the inefficiency and impracticality of the old word-of-mouth networks and, in essence, bringing the word-of-mouth network functionality into the 21st century.

Those of skill in the art will readily recognize that while each of the elements discussed above with respect to FIG. 2, FIG. 3, FIG. 4, FIG. 5, FIG. 6, FIG. 7, FIG. 8, FIG. 9, and FIG. 10, are shown as all being linked together in a single multi-component trusted source network 1200 in FIG. 12, in other embodiments, subsets of each of these elements can be linked together to form a specific multi-component trusted source network to meet the needs and/or desires of the user and/or provider. Consequently, the specific illustrative example in no way limits the invention as set forth in the claims below.

In some embodiments, data related to, describing, or representing, any of the operations or displays created by, used by, or associated with processes for linking businesses to customers through a trusted source network 200, 700, 900, and 1100, is stored and/or saved by storing/saving the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a website or in a web-based system.

In some embodiments, the means for storing the data described above are maintained, in whole, or in part, by: the user, or a user computing system; a third party data storage institution; a provider of process for linking businesses to customers through a trusted source network 200, 700, 900 and 1100; any third party service or institution; or any other parties.

Using the method and apparatus for linking businesses to customers through a trusted source network, and a process for linking businesses to customers through a trusted source network, disclosed herein, a business is provided with the immediate benefit of being able to easily start collecting authenticated reviews and feedback from their customers and these authenticated ratings and reviews are easily distributed to one or more other websites since the source of the ratings and reviews is the central authenticated rating and review/referral database. Consequently, businesses are not only provided with an opportunity to increase their exposure to potential clients, but they also can collect ratings from a wider audience. In addition, at a minimum, a potential customer/user is provided with authenticated ratings and reviews from authenticated sources so that, at a minimum, the potential customer is at least assured that a given rating or review is bona fide review.

In addition, in embodiments where the authenticated rating and review/referral database is linked to one or more networked communities, the potential customers/members of the networked community are, in one embodiment, provided with only ratings and reviews submitted by other members of the networked community and, therefore, the potential customer/member is provided with a sense of receiving a recommendation from, if not a trusted source/contact, at least a source/contact having a similar lifestyle, attributes, values, and/or needs. In addition, in one embodiment, the authenticated rating and review/referral database, and the authenticated ratings and reviews, are accessed directly through the networked community's website so that the potential customer/member feels they are never leaving their trusted community.

In addition, in embodiments were the authenticated rating and review/referral database is used to link businesses for business-to-business referrals, the businesses are exposed to potential new clients through the trusted and authenticated ratings and reviews/referrals of the authenticated rating and review/referral database. Consequently, the businesses are strongly motivated to utilize the resultant network as a means of increasing the range of their own network of contacts.

In embodiments where one or more of the various networks and/or elements discussed above are brought together through the authenticated rating and review/referral database, relatively large-scale trusted source networks are created that have the potential to provide most of the benefits of the old word-of-mouth networks while at the same time eliminating the inefficiency and impracticality of the old word-of-mouth networks and, in essence, bringing the word-of-mouth network functionality into the 21st century.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "collecting", "obtaining", "authenticating", "storing", "transferring", "linking", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for a process or application for linking businesses to customers through a trusted source network, discussed herein, are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A nontransitory computer readable storage medium for linking businesses to customers through a trusted source network comprising:
    the nontransitory computer readable storage medium having instructions stored thereon which when executed by a processor perform a process for linking businesses to customers through a trusted source network, the process comprising:
    providing an authenticated rating and review/referral database;
    obtaining access to a plurality of unauthenticated user ratings and/or reviews of a business and/or product at an unauthenticated rating and review portal, the unauthenticated ratings and/or reviews being those reviews originating from a user that has not been verified to be a bona fide customer of the business being rated or a bona fide consumer of the product being rated;
    authenticating one or more of the plurality of unauthenticated user ratings and/or reviews as originating from a bona fide customer of the business being rated or from a bona fide consumer of the product being rated, the one or more authenticated user ratings and/or reviews thus establishing authenticated ratings and/or reviews of a business and/or product;
    transferring the authenticated ratings and/or reviews of a business and/or product from the unauthenticated rating and review portal to the authenticated rating and review/referral database; and
        providing at least one authenticated rating or review from the authenticated rating and review/referral database to one or more users of a networked community website through the networked community website, wherein the authenticated rating and review/referral database includes ratings from users of the networked community website and also from users of websites other than the networked community website and wherein the users of the networked community website are only provided ratings and reviews originated by users of the networked community website;
        providing at least one authenticated rating or review from the authenticated rating and review/referral database to one or more users of a second website other than the networked community website, wherein the at least one authenticated ratings or reviews provided to the users of the second website include authenticated ratings and reviews originated by users of the networked community website in addition to ratings and reviews originated by others.

2. The nontransitory computer readable storage medium for linking businesses to customers through a trusted source network of claim 1, wherein:
    one or more of the one or more user ratings and/or reviews of a business and/or product are obtained through an e-mail provided by a business being rated and/or reviewed to a reviewer submitting the rating and/or review.

3. The nontransitory computer readable storage medium for linking businesses to customers through a trusted source network of claim 1, wherein:
    one or more of the one or more user ratings and/or reviews of a business and/or product are obtained through a website provided by a business being rated and/or reviewed.

4. The nontransitory computer readable storage medium for linking businesses to customers through a trusted source network of claim 1, wherein:
    one or more of the one or more user ratings and/or reviews of a business and/or product are obtained from a rating and review system.

5. The nontransitory computer readable storage medium for linking businesses to customers through a trusted source network of claim 1, wherein:
    access to the authenticated rating and review/referral database and the authenticated ratings and/or reviews of a business and/or product is provided to the users of the one or more business websites through the websites themselves.

6. The nontransitory computer readable storage medium for linking businesses to customers through a trusted source network of claim 1, further comprising:
    identifying and authenticating member submitted ratings and/or reviews of the one or more user ratings and/or reviews of a business and/or product submitted by reviewers who are members of the networked community.

7. The nontransitory computer readable storage medium for linking businesses to customers through a trusted source network of claim 1, wherein:
    one or more of the one or more user ratings and/or reviews of a business and/or product are obtained through the networked community website.

8. A nontransitory computer readable storage medium for linking businesses to customers through a trusted source network comprising:
    the nontransitory computer readable medium having instructions stored thereon which when executed by a processor perform a process for linking businesses to customers through a trusted source network, the process comprising:
    providing an authenticated rating and review/referral database;
    obtaining access to a plurality of user ratings and/or reviews and/or referrals of a business at an unauthenticated rating and review portal, the unauthenticated ratings and/or reviews and/or referrals being those reviews originating from a user that has not been verified to be a bona fide customer of the business being rated or a bona fide consumer of the product being rated;

authenticating one or more of the plurality of unauthenticated user ratings and/or reviews and/or referrals as originating from the bona fide customer of the business being rated or from the bona fide consumer of the product being rated, the one or more authenticated user ratings and/or reviews thus establishing authenticated ratings and/or reviews and/or referrals of a business and/or product;

transferring the authenticated ratings and/or reviews and/or referrals of a business from the unauthenticated rating and review portal to the authenticated rating and review/referral database;

providing one or more business websites;

providing users of the one or more business websites access to the authenticated rating and review/referral database and the authenticated ratings and/or reviews and/or referrals of a business through the one or more business websites;

providing one or more networked community websites;

providing at least one authenticated rating or review from the authenticated rating and review/referral database to one or more users of a networked community website through the networked community website, wherein the authenticated rating and review/referral database includes ratings from users of the networked community website and also from users of websites other than the networked community website and wherein the users of the networked community website are only provided ratings and reviews originated by users of the networked community website;

providing a business-to-business referral network; and providing members of the business-to-business referral network access to the authenticated rating and review/referral database and authenticated ratings and/or reviews and/or referrals of a business submitted by members of the business-to-business referral network through one or more websites associated with business-to-business referral network members.

9. The nontransitory computer readable storage medium for linking businesses to customers through a trusted source network of claim 8, wherein:

one or more of the one or more user ratings and/or reviews and/or referrals of a business are obtained through an e-mail provided by a business being rated and/or reviewed to a reviewer submitting the rating and/or review.

10. The nontransitory computer readable storage medium for linking businesses to customers through a trusted source network of claim 8, wherein:

one or more of the one or more user ratings and/or reviews and/or referrals of a business are obtained through a website provided by a business being rated and/or reviewed.

11. The nontransitory computer readable storage medium for linking businesses to customers through a trusted source network of claim 8, wherein:

one or more of the one or more user ratings and/or reviews and/or referrals of a business are obtained from a rating and review system.

12. The nontransitory computer readable storage medium for linking businesses to customers through a trusted source network of claim 8, further comprising:

identifying and authenticating member submitted ratings and/or reviews and/or referrals of the one or more user ratings and/or reviews and/or referrals of a business submitted by reviewers who are members of the networked community; and providing members of the networked community access to the member submitted ratings and/or reviews and/or referrals.

13. The nontransitory computer readable storage medium for linking businesses to customers through a trusted source network of claim 8, wherein:

one or more of the one or more user ratings and/or reviews and/or referrals of a business are obtained through the networked community website.

14. A system for linking businesses to customers through a trusted source network comprising:

an authenticated rating and review/referral database;

one or more business websites;

a processor;

a memory coupled to the processor and coupled to the one or more business websites and the authenticated rating and review/referral database through a network, the memory having stored therein instructions which when executed by the processor perform a process for linking businesses to customers through a trusted source network, the process for linking businesses to customers through a trusted source network comprising:

obtaining access to a plurality of user ratings and/or reviews and/or referrals of a business at an unauthenticated rating and review portal, the unauthenticated ratings and/or reviews and/or referrals being those reviews originating from a user that has not been verified to be a bona fide customer of the business being rated or a bona fide consumer of the product being rated;

authenticating one or more of the plurality of unauthenticated user ratings and/or reviews as originating from a bona fide customer of the business being rated or from a bona fide consumer of the product being rated, the one or more authenticated user ratings and/or reviews thus establishing authenticated ratings and/or reviews of a business and/or product;

transferring the authenticated ratings and/or reviews and/or referrals of a business from the unauthenticated rating and review portal to the authenticated rating and review/referral database; and providing users of the one or more business websites authenticated ratings and/or reviews of a business and/or product from the authenticated rating and review/referral database.

15. The system for linking businesses to customers through a trusted source network of claim 14, wherein:

one or more of the one or more user ratings and/or reviews of a business and/or product are obtained through an e-mail provided by a business being rated and/or reviewed to a reviewer submitting the rating and/or review.

16. The system for linking businesses to customers through a trusted source network of claim 14, wherein:

one or more of the one or more user ratings and/or reviews of a business and/or product are obtained through a website provided by a business being rated and/or reviewed.

17. The system for linking businesses to customers through a trusted source network of claim 14, wherein:

access to the authenticated rating and review/referral database and the authenticated ratings and/or reviews of a business and/or product is provided to the users of the one or more business websites through the websites themselves.

18. A system for linking businesses to customers through a trusted source network comprising:
an authenticated rating and review/referral database;
one or more networked community websites;
a processor; and
a memory coupled to the processor and coupled to the one or more business websites and the authenticated rating and review/referral database through a network, the memory having stored therein instructions which when executed by the processor perform a process for linking businesses to customers through a trusted source network, the process for linking businesses to customers through a trusted source network comprising:
obtaining access to a plurality of unauthenticated user ratings and/or reviews of a business and/or product at an unauthenticated rating and review portal, the unauthenticated ratings and/or reviews being those reviews originating from a user that has not been verified to be a bona fide customer of the business being rated or a bona fide consumer of the product being rated;
authenticating one or more of the plurality of unauthenticated user ratings and/or reviews as originating from a bona fide customer of the business being rated or from a bona fide consumer of the product being rated, the one or more authenticated user ratings and/or reviews thus establishing authenticated ratings and/or reviews of a business and/or product;
transferring the authenticated ratings and/or reviews of a business and/or product from the unauthenticated rating and review portal to the authenticated rating and review/referral database; and
providing at least one authenticated rating or review from the authenticated rating and review/referral database to one or more users of a networked community website through the networked community website, wherein the authenticated rating and review/referral database includes ratings from users of the networked community website and also from users of websites other than the networked community website and wherein the users of the networked community website are only provided ratings and reviews originated by users of the networked community website;
providing at least one authenticated rating or review from the authenticated rating and review/referral database to one or more users of a second website other than the networked community website, wherein the at least one authenticated ratings or reviews provided to the users of the second website include authenticated ratings and reviews originated by users of the networked community website in addition to ratings and reviews originated by others.

19. The system for linking businesses to customers through a trusted source network of claim 18, wherein:
access to the authenticated rating and review/referral database and the authenticated ratings and/or reviews of a business and/or product is provided to the members of the networked community through the networked community website.

20. The system for linking businesses to customers through a trusted source network of claim 18, wherein:
one or more of the one or more user ratings and/or reviews of a business and/or product are obtained through the networked community website.

21. A system for linking businesses to customers through a trusted source network comprising:
an authenticated rating and review/referral database;
one or more business websites;
one or more networked community websites;
one or more business-to-business referral networks; and
a processor; and
a memory coupled to the processor and coupled to the one or more business-to-business referral networks, the one or more business websites, the one or more networked community websites, and the authenticated rating and review/referral database through a network, the memory having stored therein instructions which when executed by the processor perform a process for linking businesses to customers through a trusted source network, the process for linking businesses to customers through a trusted source network comprising:
obtaining access to a plurality of unauthenticated user ratings and/or reviews and/or referrals of a business at an unauthenticated rating and review portal, the unauthenticated ratings and/or reviews being those reviews originating from a user that has not been verified to be a bona fide customer of the business being rated or a bona fide consumer of the product being rated;
authenticating one or more of the plurality of unauthenticated user ratings and/or reviews and/or referrals as originating from a bona fide customer of the business being rated, the one or more authenticated user ratings and/or reviews thus establishing authenticated ratings and/or reviews and/or referrals of a business;
transferring the authenticated ratings and/or reviews and/or referrals of a business from the unauthenticated rating and review portal to the authenticated rating and review/referral database;
providing users of the one or more business websites access to the authenticated rating and review/referral database and the authenticated ratings and/or reviews and/or referrals of a business through the one or more business websites;
providing at least one authenticated rating or review from the authenticated rating and review/referral database to one or more users of a networked community website through the networked community website, wherein the authenticated rating and review/referral database includes ratings from users of the networked community website and also from users of websites other than the networked community website and wherein the users of the networked community website are only provided ratings and reviews originated by users of the networked community website;
providing at least one authenticated rating or review from the authenticated rating and review/referral database to one or more users of a second website other than the networked community website, wherein the at least one authenticated ratings or reviews provided to the users of the second website include authenticated ratings and reviews originated by users of the networked community website in addition to ratings and reviews originated by others; and
providing members of the business-to-business referral network access to the authenticated rating and review/referral database and authenticated ratings and/or reviews and/or referrals of a business submitted by members of the business-to-business referral network through one or more websites associated with business-to-business referral network members.

22. The system for linking businesses to customers through a trusted source network of claim 21, wherein:
one or more of the one or more user ratings and/or reviews and/or referrals of a business are obtained through an e-mail provided by a business being rated and/or reviewed to a reviewer submitting the rating and/or review.

23. The system for linking businesses to customers through a trusted source network of claim 21, wherein:
one or more of the one or more user ratings and/or reviews and/or referrals of a business are obtained through a website provided by a business being rated and/or reviewed.

24. The system for linking businesses to customers through a trusted source network of claim 21, wherein:
one or more of the one or more user ratings and/or reviews and/or referrals of a business are obtained from a rating and review system.

25. The system for linking businesses to customers through a trusted source network of claim 21, further comprising:
identifying and authenticating member submitted ratings and/or reviews and/or referrals of the one or more user ratings and/or reviews and/or referrals of a business submitted by reviewers who are members of the networked community; and
providing members of the networked community access to the member submitted ratings and/or reviews and/or referrals.

26. The system for linking businesses to customers through a trusted source network of claim 21, wherein:
one or more of the one or more user ratings and/or reviews and/or referrals of a business are obtained through the networked community website.

* * * * *